United States Patent [19]
Moss

[11] 3,807,090
[45] Apr. 30, 1974

[54] PURIFICATIONS OF FUELS
[75] Inventor: Gerald Moss, Oxford, England
[73] Assignee: Esso Research and Engineering Company
[22] Filed: Dec. 6, 1972
[21] Appl. No.: 312,718

Related U.S. Application Data
[63] Continuation of Ser. No. 94,476, Dec. 2, 1970, abandoned, which is a continuation-in-part of Ser. No. 734,816, June 5, 1968, abandoned.

[52] U.S. Cl............. 48/128, 23/230 A, 23/253 A, 23/288 S, 48/211, 208/208 M, 423/539
[51] Int. Cl. .......................... C10k 1/12, C10k 1/30
[58] Field of Search............. 48/211, 212, 213, 128; 23/288 S, 284, 230 A, 253 A

[56] References Cited
UNITED STATES PATENTS
2,756,191  7/1956  Fritz ................................ 23/288 S
2,960,546  11/1960  Nobis et al. .................... 208/208 M
3,583,905  6/1971  Oguchi et al. ..................... 23/288 S Primary Examiner—Morris O. Wolk
Assistant Examiner—R. E. Serwin

[57] ABSTRACT

Fuels containing sulphur are purified by (a) partial combustion or (b) full combustion, at 800°–950°C in a bed of CaO and/or MgO which combines with the sulphur. The sulphurized CaO or MgO is reactivated by contact with a regenerator gas at 1,000°–1,150°C with the evolution of $SO_2$. Vanadium and sodium removal from the fuel is enhanced by the presence of iron and alumina, respectively.

42 Claims, 18 Drawing Figures

OPTIMUM TEMPERATURE FOR SULPHUR OXIDE ABSORPTION BY LIME (31% OF BED REACTED)

SULPHUR OXIDE ABSORPTION BY LIME AT 865°C

Gerald Moss Inventor

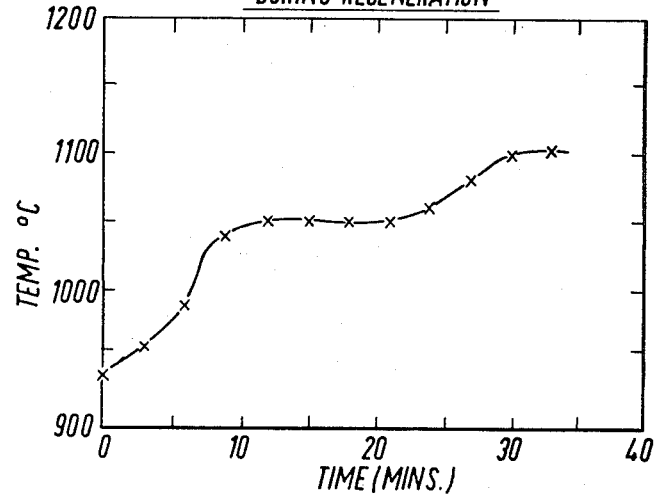
FIG. 3. TYPICAL TEMP VS. TIME CURVE DURING REGENERATION
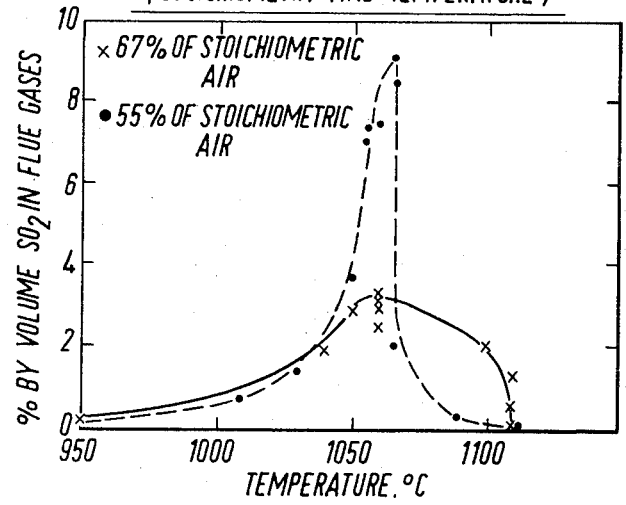
FIG. 4. REGENERATION OF SULPHATE LIME BEDS (STOICHIOMETRY AND TEMPERATURE)

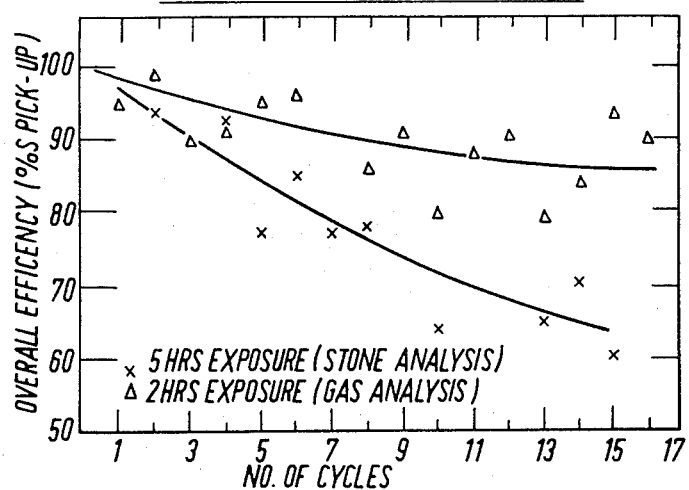
FIG. 5. VARIATION OF SULPHUR ABSORPTION EFFICIENCY WITH NO. OF CYCLES
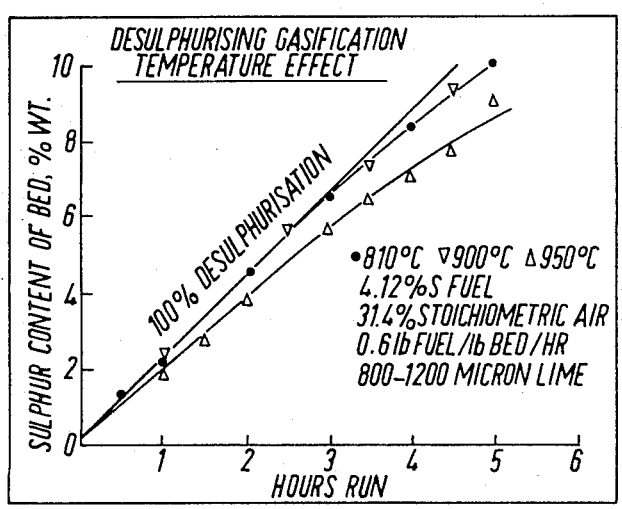
FIG. 6.

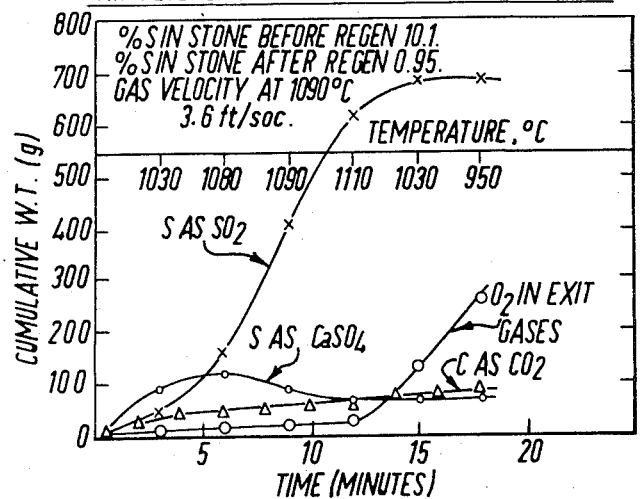
FIG. 7. AIR REGENERATION OF SULPHIDED BED MATERIAL
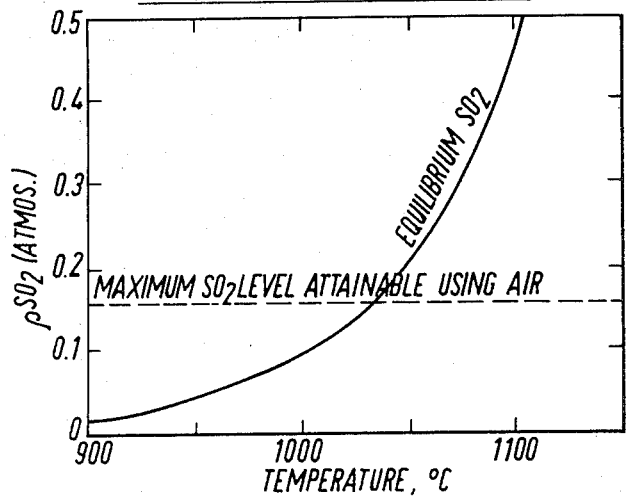
FIG. 8. EFFECT OF TEMPERATURE ON THE EQUILIBRIUM $SO_2$ PARTIAL PRESSURES FOR THE REACTION OF OXYGEN WITH CALCIUM SULPHIDE
Gerald Moss Inventor

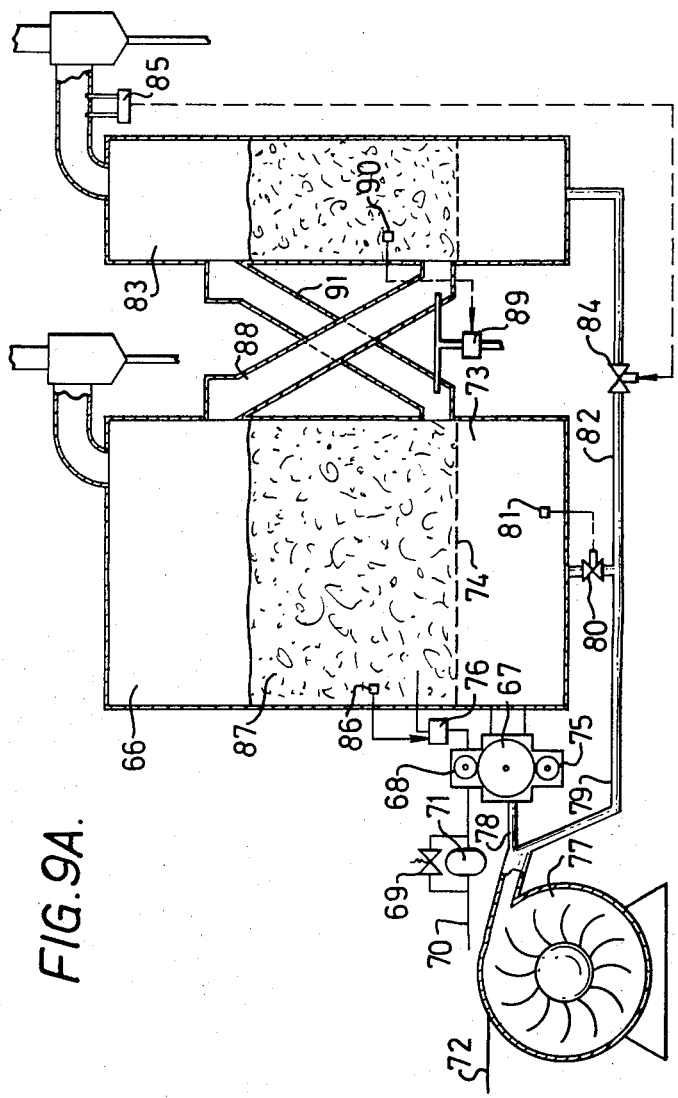

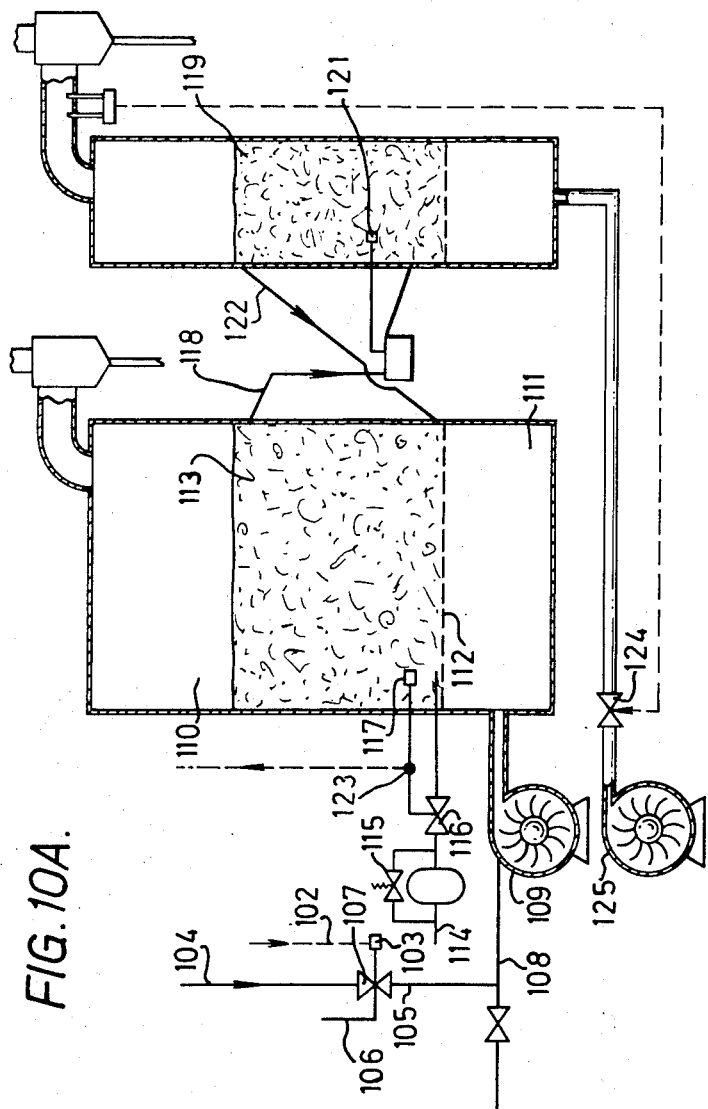

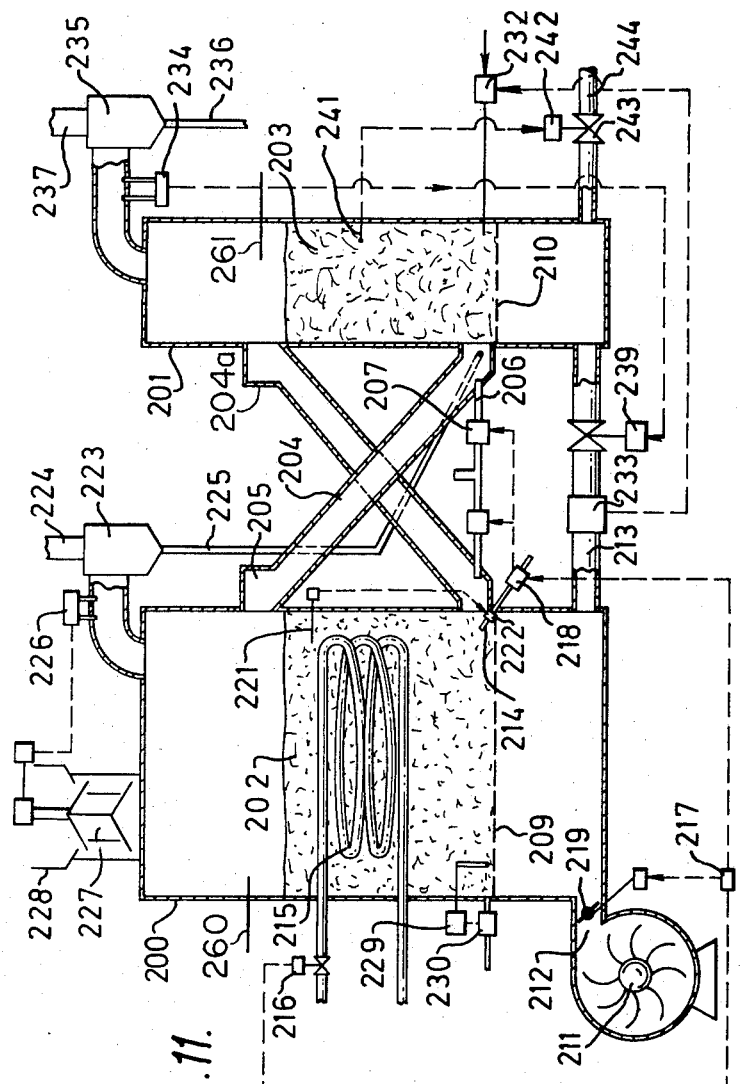

PURIFICATIONS OF FUELS

This is a continuation of application Ser. No. 94,476, filed Dec. 2, 1970, now abandoned, which in turn is a continuation-in-part of application Ser. No. 734,816, filed June 5, 1968, now abandoned.

The present invention relates to the purification of fuels, particularly hydrocarbon fuels such as liquid hydrocarbons, (e.g., fuel oils), solid hydrocarbons (e.g., coal) and gaseous hydrocarbons, such as natural gas, and of fuel, or flue gases derived therefrom. The invention is particularly directed to the removal of sulphur from the fuels, or from fuel gases, or flue gases, derived from the said hydrocarbons. In a preferred form of the invention the sulphur is recovered, either as elemental sulphur or as a sulphur compound. Other impurities, e.g., vanadium and sodium may also be removed.

Most hydrocarbon fuels contain sulphur and a major cause of air pollution by sulphur dioxide is the sulphur derived from the fuel when it is burned in industrial installations such as coal and oil fired power stations. Most of the sulphur in the fuel fired in a boiler leaves as sulphur dioxide in the flue gas. Apart from the foregoing the presence of sulphur in the fuel is undesirable in many industrial furnace applications either because of produce quality deficiency, for example in the production of low sulphur lime for the steel industry, or because of a loss of production caused by wastage, for example, by scale formation in the reheating of steel.

A massive effort has been devoted, over a long period of time to the removal, or reduction, of the sulphur content in hydrocarbon fuels and in fuel and flue gases derived therefrom. The problem has generally been approached according to one of the following three methods, namely by the selection of low sulphur fuel, by the removal of sulphur from the fuel before combustion, or by the removal of $SO_2$ from the flue gas after combustion. The selection of low sulphur fuel is the simplest solution to the problem but unfortunately supplies of low sulphur fuel are comparatively small and thus major reliance must be placed on high sulphur fuels (e.g., fuels containing 2.5 percent by weight or more of sulphur). The second method, removal of sulphur from the fuel before combustion, or reduction to a lower level (e.g., 0.5 to 1.0 percent by weight) can be achieved by known processes but is expensive. Furthermore, this method, although applicable to fuel oils, is not suitable for treating solid hydrocarbon fuels, e.g., coal. Inorganic sulphur compounds present in coal (e.g., as iron pyrites) can be reduced by selective separation and washing techniques but organic sulphur compounds are much more difficult to treat.

The third alternative, namely flue gas desulphurization, has been the subject of considerable investigation. Amongst processes which have been described for this purpose are the direct injection of dry lime/dolomite or of wet lime, or of lime slurry, into the combustion process. In the lime slurry process the solid waste causes a disposal problem and the process costs are high whilst in the dry lime method only a fraction of the material has proved to be very reactive and once this fraction has reacted the balance reacts very slowly.

Another process is to employ aqueous potassium sulphite as an absorbant for sulphur containing gases. In still another method alkalized alumina is used in a dry absorption process. Other processes are the direct oxidation of $SO_2$ to $SO_3$ in the presence of a catalyst, the use of manganese dioxide as an absorbent by direct injection into flue gas, and the injection of ammonia. Most of these processes will achieve the desulphurization of flue gases to low levels of $SO_2$ but they have technical limitations which make them expensive, or otherwise unattractive, such as attrition or loss of the absorbent, substantial costs for corrosion resistant equipment, and the formation of undesirable end products.

The present invention provides a method of removing sulphur from a sulphur-containing fuel in which the fuel is passed to a reactor having a gas distributor at its base and containing a bed of particles comprising alkaline earth metal oxide at an elevated temperature fluidised by an upwardly flowing stream of free oxygen containing gas supplied through at least part of the said distributor, the fuel being at least partially burned with the oxygen, and sulphur in the fuel reacting with the said alkaline earth metal oxide to form a solid compound comprising sulphur and alkaline earth metal thereby converting the fuel into a substantially sulphur-free product which leaves via the top of the reactor, transferring particles continuously from the region of the top of the fluidised bed in the reactor to a bottom zone of a regenerator wherein a bed of particles is contained and fluidised by an upwardly flowing stream of a regenerating gas which converts at least some of the said solid compounds comprising sulphur and alkaline earth metal to alkaline earth metal oxide with the release of sulphur dioxide, transferring particles continuously from the region of the top of the fluidised bed in the regenerator to the bottom zone of the reactor at approximately the same rate as the rate of transfer of particles from the reactor to the regenerator, regulating the rate of supply of fuel to the reactor, regulating the rate of supply of the free oxygen containing gas to the reactor above a lower limit such that the superficial velocity of gas in the reactor is sufficiently high to prevent any substantial defluidisation of particles in the reactor bed above at least the said part of the distributor, deriving a signal representative of temperature in the reactor bed and maintaining the temperature in the reactor bed substantially within the range 800°–950°C in response to the temperature representative signal, deriving a signal representative of the temperature of the regenerator bed and maintaining the temperature in the regenerator bed substantially within the range 1,000° to 1,150°C.

From the point of view of availability, reactivity and cost effectiveness, the preferred alkaline earth metal oxide is calcium oxide, although other alkaline earth metal oxides may also or alternatively be used. Calcium oxide is conveniently provided in the form of lime, or derived from limestone or dolomite: the limestone or dolomite may be calcined at low temperatures to convert the calcium carbonate content to reactive lime either before being supplied to the reactor or regenerator or while in the reactor or regenerator.

Above 950°C the efficiency of the process falls markedly and below 800°C recarbonation of CaO is liable to occur. The actual temperature at which recarbonation starts depends on the partial pressure of $CO_2$, $P_{CO_2}$, in the reactor. At $P_{CO_2} = 0.15$ it is between 750° and 850°C. If $P_{CO_2}$ falls the critical temperature also falls. For the lowest likely $P_{CO_2}$ in the present process, recarbonation will occur below between 700° and 730°C. The sulphur dioxide released in the regenerator is preferably recovered for further use; thus it may be concentrated and compressed to provide liquid sulphur dioxide; it may be subjected to a further reaction to produce elemental sulphur, or it may be further treated to produce a useful sulphur compound such as sulphuric acid. Not only is the product leaving the reactor substantially free of sulphur but also other impurities such as vanadium and sodium tend to be removed. The removal of vanadium is enhanced, especially when the reactor bed is heated from beneath the distributor when the particles comprise iron, e.g., as an iron oxide, and sodium removal is improved by the presence of alumina in the particles or bed of particles.

Temperature control in the reactor, to ensure operation within the required temperature range, may be achieved in various ways as previously indicated. More specifically, temperature control may be achieved by heat exchange methods or by varying the amount of oxygen available for the reactions involved, e.g., by recirculating flue gases with the free oxygen containing gas, under controlled conditions, by varying the proportioning of hydrocarbon and combustion air, by preheating the free oxygen containing gas by underfiring beneath the distributor, by the addition of water or steam to the fluidised bed and/or to recycle effluent gases or by any convenient combination of the foregoing ways. Within the regenerator temperature may be controlled, e.g., by controlling circulation of fluidized bed material between the reactor and the regenerator, or by adding controlled amounts of make up or reactive particles to the reactor or regenerator, by preheating the free oxygen containing gas, by varying the rate or composition of the regenerator gas or of any suitable air or oxygen, e.g. providing from 40–80 percent, preferably 50–70 percent and more preferably about 55 percent of the amount of oxygen required for stoichiometric reaction. Reducing gases may alternatively be provided from other sources, such as a water gas producer.

Increasing the temperature, within the stated regeneration temperature range, increases the formation of $SO_2$; this is accompanied by a decrease in the amount of reducing gas partial pressure. Increasing the initial reducing gas partial pressure also increases the $SO_2$ partial pressure but the temperature at which substantial conversion of CaO takes place is raised. For a satisfactory $SO_2$ partial pressure (e.g., approaching 0.1 atmosphere) with substantially complete regeneration of $CaSO_4$ to CaO, regeneration temperatures of 1,040°C, or higher, preferably about 1,090°C, are desirable.

In this method of operation, the fluidized bed, in effect, replaces the conventional combustion chamber of a furnace. There is a large heat release and this heat can be removed by a heat transfer medium, such as steam, passing through tubing submerged in the bed. Hot flue gases leaving the fluid bed may release further heat to secondary heat exchangers, such as economizers and preheaters.

Where the method of the invention is operated with reducing, rather than oxidizing, conditions in the reactor the substantially sulphur free product leaving the reactor is a fuel gas, and the regenerator is operated under oxidising conditions.

The principal sulphur compound formed in the reactor is then calcium sulphide. Sulphur may be released from the fuel mainly as $H_2S$ and $SO_2$, plus some COS and $CS_2$ and the alkaline earth sulphide is probably formed either by reaction of $H_2S$ with bed material or by a more direct combining of the sulphur in the fuel with alkaline earth metal. Where the reaction is through the intermediary of $H_2S$, the reaction of $H_2S$ with calcium oxide disturbs the $H_2S/SO_2$ equilibrium, and more $H_2S$ is formed and made available for absorption. In this method the combustion of fuel oil takes place in a fluidised bed of lime, and/or calcined dolomite particles with insufficient air for complete combustion to occur. The reaction bed temperature is 800°–950°C, preferably 800°–900°C and sulphur in the fuel oil reacts with the fluidised bed of lime to form calcium sulphide.

Control over the bed temperature is important since excessively high temperatures deactivate the particles by causing a change in their microscopic structure, while excessively low temperatures bring about heavy carbon deposition due to fuel cracking and hence a corresponding loss of reactivity. In addition, as with any chemical process, the reaction rate is temperature dependent and the sulphur removal becomes less as the temperature falls: bed temperature control may be achieved by the various methods hereinbefore indicated, such as by heat exchange. In the case of low superficial gas velocity through the reactor, heat may be removed, e.g., by a coil immersed in the fluidized bed. With high superficial velocities, heat may be removed by an external heat exchange coil or a water jacket. Another method of control over bed temperature is by calcination of fresh dolomite or limestone feed with continuous removal of excess material from the reactor or generator. Under these conditions the endothermic reaction of limestone to lime and carbon dioxide is used to balance excess heat generated during partial combustion of the fuel at gas velocities of, e.g., 3 feet per second. When operating the reactor under reducing conditions (e.g., as a gasifier) at low gas velocities it has been found that carbon tends to be deposited at and below the level of the fuel injectors. This problem may be overcome by preheating the combustion air by indirect heat exchange or by using, for example, a little fuel injected into a precombustion chamber below the distributor of the reactor fluid bed. The amount of carbon deposition may also be reduced by injecting fuel into the reactor at a position which is fairly close to the region of the reactor into which hot particles from the regenerator are transferred. Some advantage may also be secured in this respect by injecting a proportion of the fuel (say 20–30 percent) at the position of the entrance of the hot particles to the reactor. This also is advantageous in that the temperature of the particles entering the reactor is reduced to about the optimum working temperature.

The reacted particles are regenerated in the separate regenerator under oxidising conditions suitably provided by air or other free oxygen containing gas at a temperature in the range of 1,000°–1,150°C preferably 1,040°–1,090°C.

To obtain good desulphurisation when operating the process to obtain fuel gases, it is desirable to gasify the fuel with between 15 and 45 percent, preferably between 20 and 40 percent, of the stoichiometric air requirements. It will be appreciated that it is advantageous from the point of view of the size of the reactor and from the point of view of the calorific value of the product fuel gases that as little air as possible should be employed for the gasification. However, appreciable quantities of carbon tend to be deposited upon the particles in the reactor bed at low stoichiometric air ratios and this leads to reduced sulphur-absorption efficiency. The amount of carbon deposited for a given stoichiometric ratio can be reduced by good design of the distributor such that fluidization is relatively uniform in the reactor bed, and can also be reduced by increasing the superficial velocity of gas through the reactor bed. The combustion products leaving the bed retain about 70 percent of the total calorific value of the fuel, together with the major part of the remaining fuel calorific value as sensible heat. At stoichiometric air ratios as low as of the order of 20–30 percent, the gasification is marginally exothermic for a bed temperature in the region of 850°C and is therefore self sustaining with minimum heat removal from the bed for temperature control purposes. Below 20 percent of the stoichiometric requirement, some additional heating is usually necessary, such as by preheating the air or oxygen input. Since in this case, only say 25 percent of the air required for total combustion of the fuel passes through the reactor bed, the size of the fluid bed needed to desulphurise a given fuel throughput is considerably smaller than that required in the oxidizing method.

In this mode of operation the bed operates, as previously stated, as a gasifier yielding a hot producer gas which may be burned in a boiler. This method of operation is particularly useful for the operation of boilers, and is particularly suitable for the conversion of existing boilers, particularly large scale boilers, e.g., 50 megawatt or more.

The oxidation of calcium sulphide to calcium oxide in the regeneration step is a highly exothermic reaction. It has been found that maximum $SO_2$ evolution with air regeneration is obtained at temperatures of 1,040°C and above, especially 1,040°–1,090°C.

It has been found that a concentration of $SO_2$ of 15 percent by volume can be obtained when regenerating CaS by oxidation at a temperature in the region of 1,080°–1,090°C, in the absence of $CO_2$. It has been previously stated that, when forming CaS in the reactor in the presence of less than 25 percent stoichiometric air, a significant amount of carbon is formed. It has been found that there is a tendency for some carbon lay down on the bed, even with 25 percent, or more, of stoichiometric air. This carbon is burned off in the regenerator providing some heat but the effect of carbon, in regenerating under oxidising conditions, is to reduce the $SO_2$ concentration since there is competition for oxygen between the carbon and the sulphur of the particles and thus it is desirable to minimise carbon lay down in the reactor. In practice some $CaSO_4$, also, will always be formed, undesirably reducing the evolution of $SO_2$, but this $CaSO_4$ formation has been found to be at a minimum and virtually negligible in the temperature range of 1,060°–1,090°C.

The invention is further illustrated by reference to the accompanying drawings in which:

FIG. 3 shows a typical temperature relationship in batch regeneration, using reducing regenerating gas.

FIG. 4 illustrates the effect of sub-stoichiometric air ratio on $SO_2$ evolution in the regeneration of CaO from $CaSO_4$.

FIG. 5 illustrates the effect of repeated regeneration cycles, using a reducing regenerating gas for recycle, on absorption efficiency.

FIG. 6 illustrates the effect of temperature on desulphurisation in typical gasification reactions with oxidative regeneration.

FIG. 7 illustrates the process of a batch regeneration of a sample of CaS from a gasifier with air.

FIG. 8 shows $SO_2$ partial pressures to satisfy equilibria at given temperatures.

Figure 9:
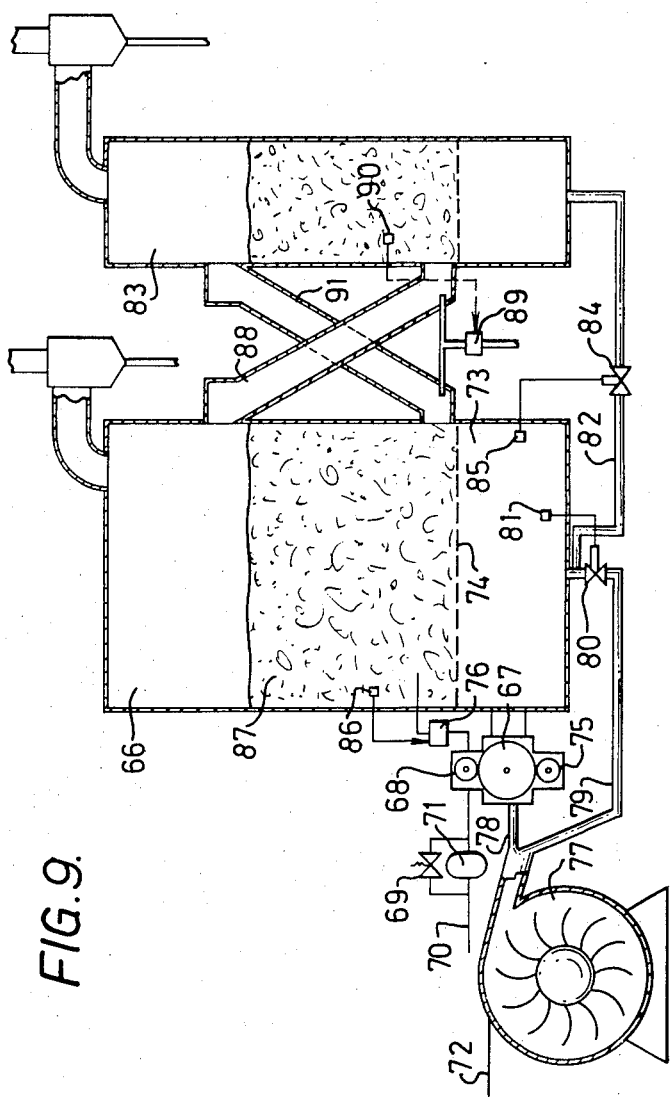

FIG. 9 diagrammatically illustrates a system for producing substantially sulphur free combustible fuel gases.

FIG. 9A diagrammatically illustrates another system for producing substantially sulphur free combustible fuel gases.

Figure 10:
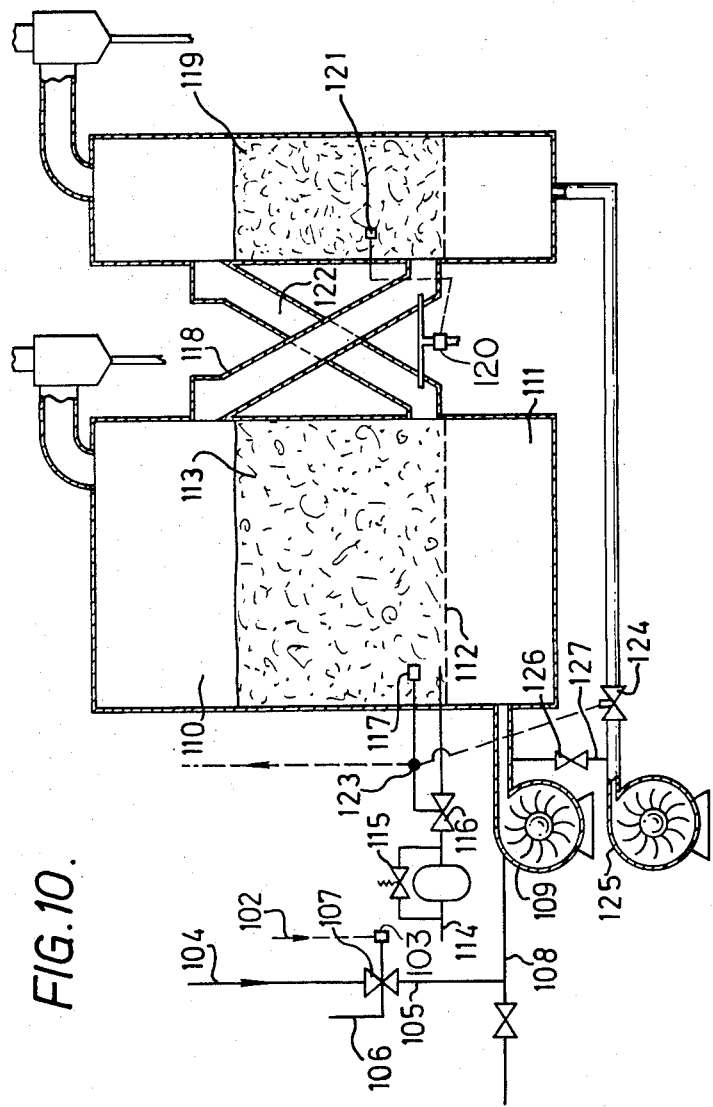

FIG. 10 is a diagram of yet another system for producing substantially sulphur free combustible gases.

FIG. 10A shows diagrammatically a further system for producing substantially sulphur free combustible gases.

FIG. 11 is a diagram of a boiler system for producing useful heat and substantially sulphur free flue gases.

Figure 11A:
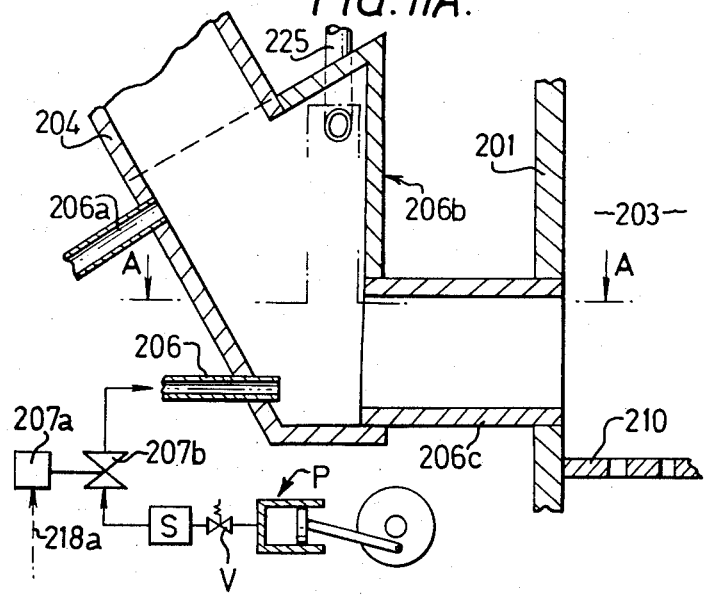

FIG. 11A is an enlarged cross-sectional view of part of the system of FIG. 11.

Figure 11B:
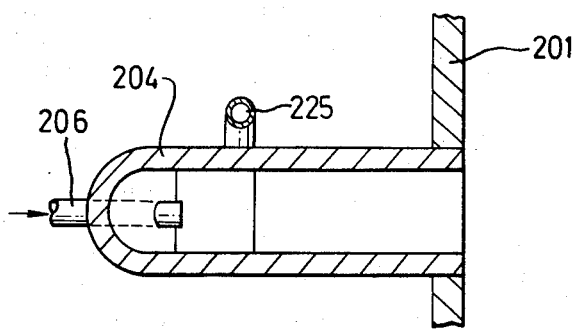

FIG. 11B is a plan cross-sectional view taken on line A—A of FIG. 11A.

Figure 12:
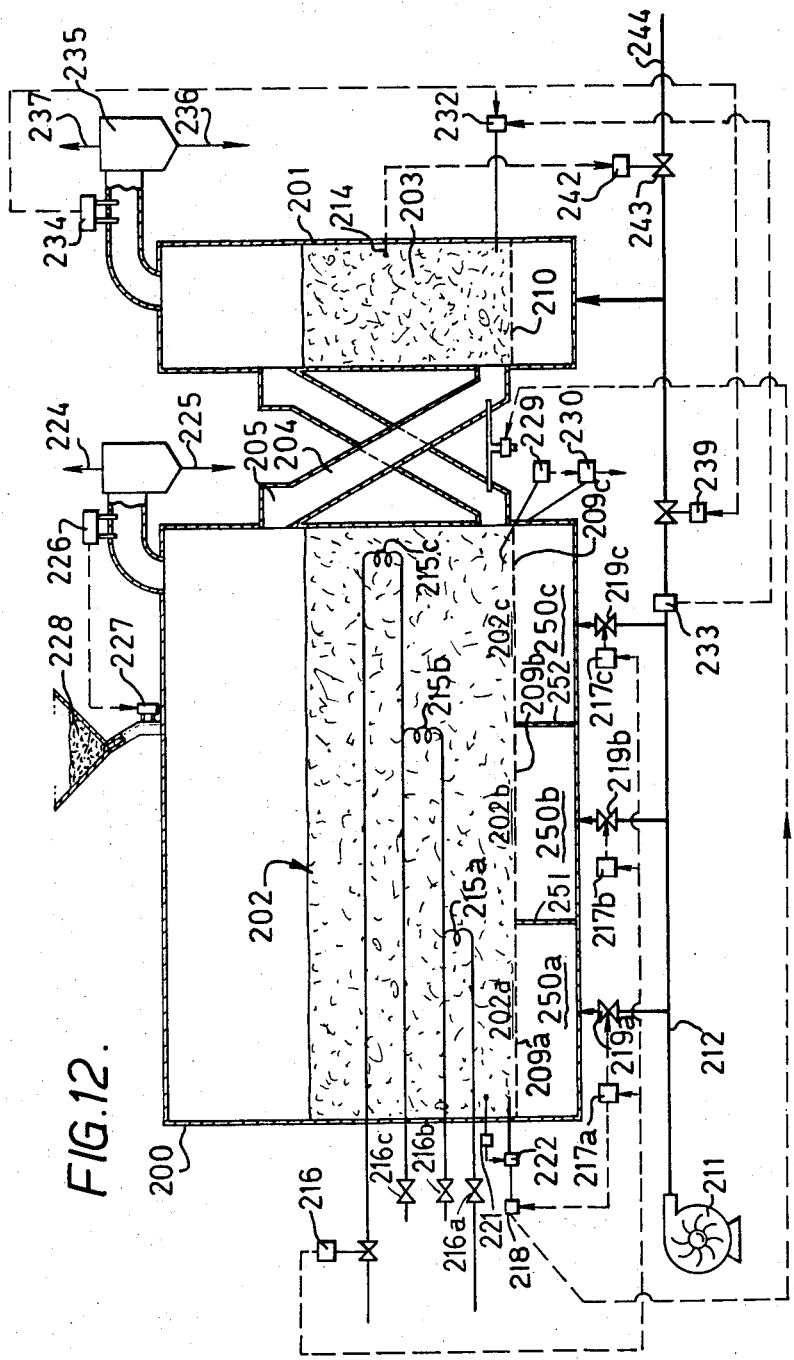

FIG. 12 is a diagram of a boiler system capable of producing a wide output of heat loadings.

Figure 13:
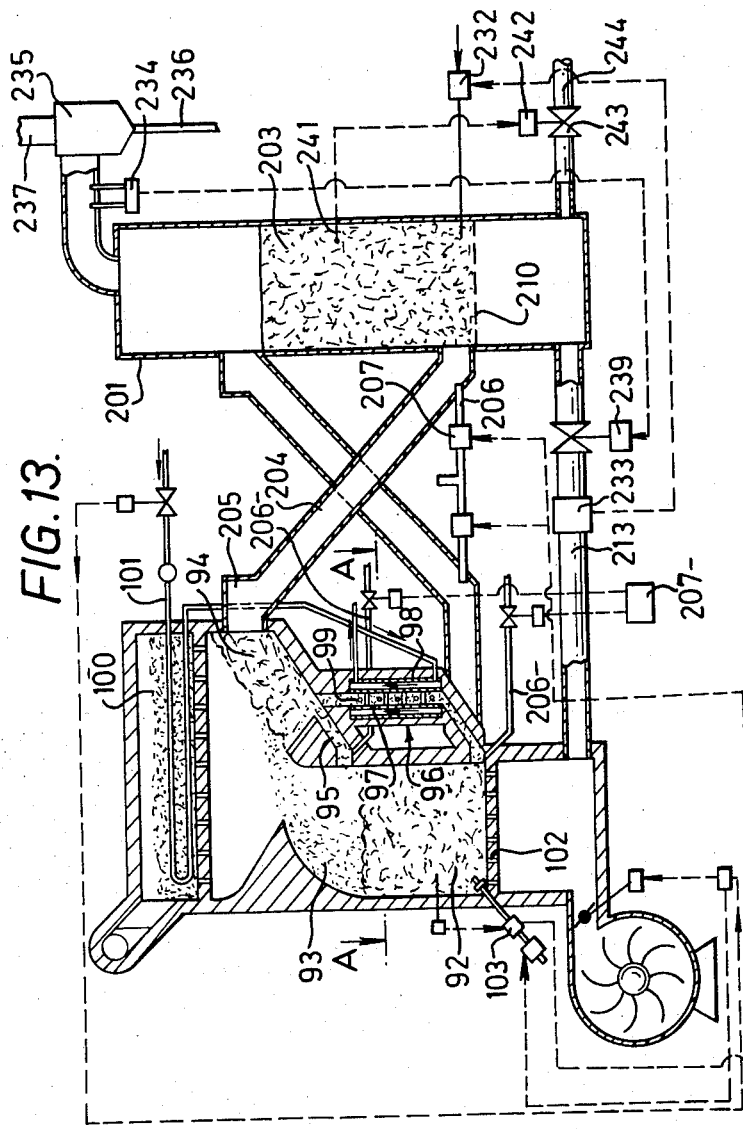

FIG. 13 is a diagram of another system capable a wide variations in heat output.

Figure 14:
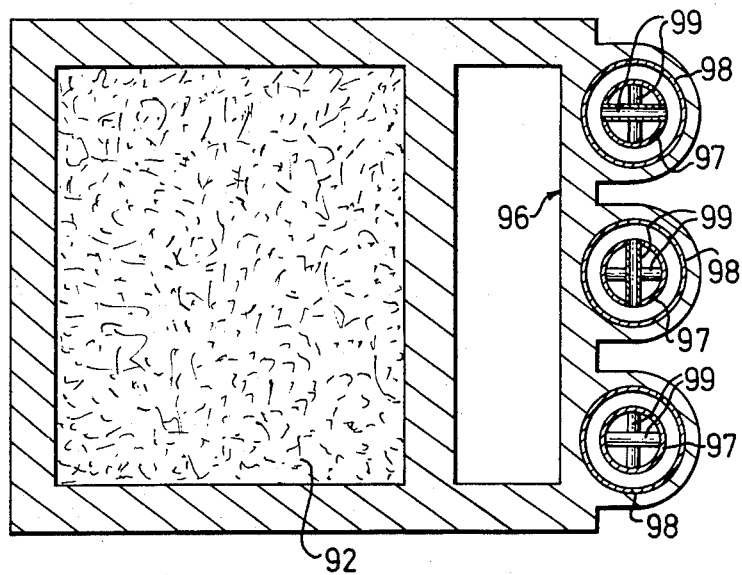

FIG. 14 is a cross-sectional plan taken on line A—A of FIG. 13.

Figure 1:
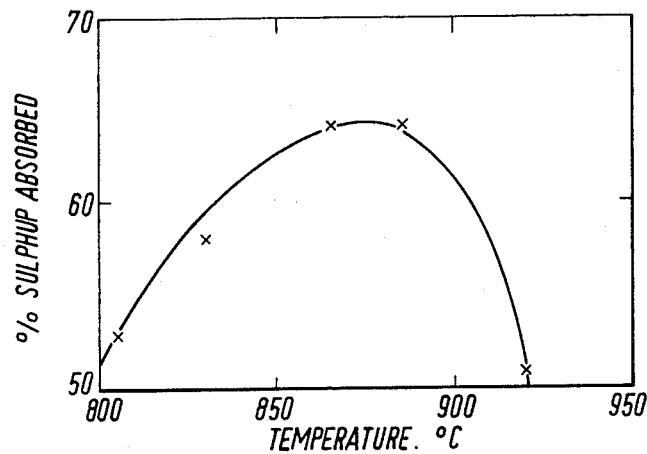
FIG. 1 shows a typical relationship between the absorption of $SO_2$ by lime and temperature, under oxidising conditions.
Figure 2:
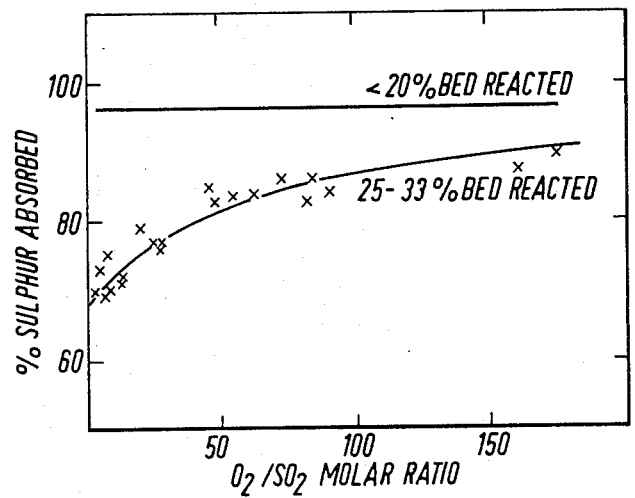
FIG. 2 shows the percentage absorption of $SO_2$ by lime at 865°C in relation to the mol ratio of $O_2/SO_2$.

Experiments under oxidising conditions have been carried out using lime of particle size 100–200 microns contained in a heated reactor through which a furnace flue gas was passed at a superficial gas velocity of 1 foot per second. The temperature of the reactor was controlled at levels between 800° and 900°C, and the flue gas contained varying amounts of excess air. Using a fresh reagent bed, sulphur was absorbed with an efficiency of 90 to 95 percent to form calcium sulphate. At low bed utilization (less than 20 percent) neither the effect of oxygen partial pressure, nor that of temperature was detected but after the bed was 25 to 33 percent reacted, it was possible to show that sulphur absorption is most efficient at a bed temperature in the region of 860°C. (These results are illustrated in FIGS. 1 and 2).

The optimum temperature (shown in FIG. 1) cannot be deduced from a knowledge of equilibrium constant for the simple reaction calcium oxide plus sulphur dioxide plus oxygen equals calcium sulphate.

Work on regeneration of calcium oxide from calcium sulphate was carried out in a low velocity batch combustor to determine the effect of repeated cycles of absorption and regeneration on reagent life. It was found that batch regeneration is best achieved directly after absorption by increasing the fuel rate such that a stoichiometric air rate of from 40–60 percent, preferably in the region of 55 percent is achieved and by cutting out a bed cooling coil. In these conditions the temperature rises, (as indicated in FIG. 3), until a value of 1,090°C is achieved at which sulphur dioxide evolution appears to be at a maximum reaching a peak of about 9 percent. During this rapid evolution of sulphur dioxide the endothermic nature of the calcium sulphate decomposition controls the temperature. After most of the $SO_2$ is driven off the temperature again rises up to about 1,100°C. As shown in FIG. 4 the stoichiometric air rate employed has a marked effect on the regeneration rate, a rate of 67 percent being greatly inferior to 55 percent.

The presence of an oxidising zone in the regenerator ensures that sulphide formed above the fuel injection point is decomposed as the bed particles pass below it. As a result, the elimination of sulphur from the spend reagent is practically complete as shown in Table I below.

TABLE I

REGENERATION OF SULPHATED LIME

| Stoichiometric Combustion Air | Regeneration Temperature | Bed Sulphur Content Before Regeneration | After Regeneration |
|---|---|---|---|
| % | °C | % | % |
| 67 | 1066 | 10.4 | 5.5 |
| 59 | 1050 | 9.3 | 1.2 |
| 59 | 1050 | 7.9 | 0.2 |
| 55 | 1065 | 11.1 | 1.3 |

To determine the effect of repeated cycles of absorption and regeneration upon the reagent activity, a series of 15 consecutive cycles was carried out in which, during the absorption cycles, a 4 percent sulphur fuel was burned in the bed using sufficient combustion air to maintain 6 percent of oxygen in the flue gas. In addition, sufficient sulphur dioxide was added to the reactor to give an "untreated" flue gas sulphur content equivalent to 0.6 percent $SO_2$, equivalent to combustion of 9.5 percent sulphur fuel. During absorption, the temperature was maintained at 850°C, and the gas superficial velocity at 3 feet per second.

Absorption runs were carried on for 4 to 5 hours and throughout this period the gas leaving the reactor was monitored for $SO_2$ content. At the end of each absorption period the steam cooling to the bed was shut off, and the temperature was permitted to rise to 1,000°C. At this point the fuel rate was increased to achieve a stoichiometric air rate of about 55 percent. $SO_2$ evolution began at about 1,000°C and reached a peak at 1,090°C; regeneration was continued until all $SO_2$ evolution has ceased. (FIG. 5 summarises the results of these studies). The absorption regeneration cycles cause deterioration in the ability of the lime reagent to absorb sulphur. In a fresh bed, the cumulative sulphur absorption efficiency at the end of 5 hours exposure during the run was about 94 percent and this dropped to about 60 percent at the end of a 5 hours run in the course of 15 cycles. The cumulative efficiency of a fresh bed after 2 hours exposure was about 97 percent dropping to a value of between 80 and 90 percent at the end of 2 hours over 15 cycles. It appears that after about 10 cycles of 2 hours each little further deactivation of the reagent occurs.

In the reducing (partial combustion) method sulphur removal studies were carried out a in a low gas velocity batch combustor using fresh batches of calcined lime and a superficial gas velocity of 1 to 2 feet per second. The stoichiometric air rate ratio was varied between 0.2 and 0.38 and the effect of temperature was studied in the range of 800° to 950°C. The fuel gas produced from the combustor was comparatively rich in carbon dioxide and in cracked products, only about 40–50 percent of fuel carbon being accounted for by carbon oxides. The analysis of a typical gas from operations at a stoichiometric rate of 30 percent air is shown in Table II.

TABLE II

GAS FROM OPERATION AT STOICHIOMETRIC AIR RATE OF 30%

| Gas Volume: | 3.92 Nm³/kg Fuel |
|---|---|
| Composition | (Vol.%) |
| $H_2$ | 8.2 |
| $O_2$ | 1.2 |
| $N_2$ | 64.0 |
| $CO_2$ | 10.6 |
| CO | 8.5 |
| $C_1$ hydrocarbon | 3.3 |
| $C_2$ | 3.2 |
| $C_3$ | 0.7 |
| $C_4$ | 0.2 |
| $C_5$ | 0.02 |
| Toluene | 0.01 |
| $C_8$ aromatics | 0.01 |
| Naphthenic | 0.01 |
| Suspended soot, tar, etc. g/Nm₃ | 48 |

FIG. 6 shows the results of three tests using a 4.1 percent sulphur fuel at a stoichiometric rate of 31 percent air, an overall fuel rate of 0.6 weights/weight bed/hour and at bed temperatures of 810°, 900° and 950°C, respectively. A plot of bed sulphur content versus hours run is linear whilst bed sulphur is low (less than 5 percent sulphur on bed), and indicates virtually complete desulphurisation of the gas at 810° and 900°C. A marked reduction occurs in desulphurisation efficiency above 950°C. As previously mentioned below 800°C recarbonation of the lime is liable to occur, the temperature at which this happens being related to $P_{CO_2}$.

The regeneration of a lime reagent which has absorbed sulphur as sulphide under gasifying conditions may be achieved simply by shutting off the fuel supply and allowing air alone to contact the hot bed. The oxidation of calcium sulphide is strongly exothermic and the temperature immediately begins to rise. All the oxygen supplied to the bed is absorbed and sulphur dioxide begins to be evolved in significant quantities when the temperature rises to the vicinity of 1,040°. Both calcium sulphate and calcium oxide are formed in the early stages of the reaction, (as is indicated in FIG. 7) and as the temperature rises it appears that some decomposition of the sulphate takes place. FIG. 7 shows that some combustion of carbon is associated with the regeneration. Spent reagent beds have been found to contain about 0.3 percent of carbon which is burned off in the early stages of the regeneration. FIG. 8 shows the $SO_2$ partial pressures to satisfy the respective equilibria at different temperatures.

If the reagent is subjected to repeated absorption/regeneration cycles some material is lost by attrition, and in addition its activity as a sulphur absorbent declines. Experiments have been performed in which 40 or more cycles of absorption/regeneration were carried out, and in which varying quantities of reagent were removed and replaced with fresh material at the end of each cycle, in order to determine its effect of fresh make up rate on sulphur absorption efficiency.

In these experiments, the absorption part of the cycle was fixed at 100 minutes, during which sulphur content rose to a value between 3.0 and 4.0 percent. Underfiring was practised during absorption, 25–30 percent of the total air supplied being consumed by this process. Regeneration was carried out by shutting off the fuel supply and allowing air alone to contact the bed. Bed samples were taken for sulphur analysis at the beginning and end of each absorption period. The total material lost by attrition and measured by sampling was kept constant, and a predetermined quantity of fresh make up material was added to the bed at the end of each cycle.

The conditions used in these experiments, and the results obtained are summarised in Table III below.

TABLE III

| | |
|---|---|
| Bed weight | 18 lbs |
| Bed Particle Size (Initial) | 800–1200 microns |
| Bed Temperature | 800–900°C |
| Air Rate | 30–35% of Stoichiometric |
| Gas Velocity | 0.8m/Sec. |
| Fuel Sulphur | 3.3% |

| Bed make up rate (wt. CaO/wt S) | 0.55 | 1.2 | 1.52 | 2.15 |
|---|---|---|---|---|
| Sulphur absorption efficiency (steady state) | 64 | 84 | 99 | 99 |

During these trials, the particle size of the bed material changed quite considerably, and a typical example of the change is outlined in Table IV below.

TABLE IV

| | Fresh Bed | Bed After 40 cycles |
|---|---|---|
| % of bed sizes between 800 and 1200 microns | 100 | 54.8 |
| % of bed sized between 600 and 800 microns | nil | 35.6 |
| % of bed sized below 600 microns | nil | 9.6 |

The results shown in these tables are of course applicable only to the gas velocity and bed particle size shown in Table III. The use of a bed having a smaller mean particle size could be expected to lead to 100 percent sulphur absorption using a smaller fresh make up rate.

Another important parameter is the transfer of the bed material between the absorber and the regenerator which is controllable over a wide range thus allowing control over bed recirculation rate, which has a major influence on absorbed bed sulphur level and the consequent degree of regeneration needed to maintain a given overall efficiency of absorption.

In the preferred form of the invention there is continuous recirculation of fluidized bed material between the absorber and the regenerator, with continuous or intermittent make up of bed supplied by fresh material. It will be appreciated that fluidized bed material passing to the regenerator is not completely reacted and fluidized bed material passing from the regenerator to the absorber is not necessarily fully regenerated.

The superficial gas velocity within a fluidized bed desulphurising gasifier is conveniently in the range of 3 to 5 feet per second at a temperature of, say, 900°C. Air at 900°C has four times the volume of air at ambient temperatures, consequently if the bed is to be suitably fluidised then the initial fluidisation velocity must be less than three-fourths of a foot per second on the assumption that the air is cold on entering the bed. In practice there is some latitude due to heat transfer to the incoming air but there is a value of superficial gas velocity within the bed, say 2 feet per second, for a bed designed to operate at e.g., 3 feet per second, at which material begins to settle out at the base of the bed. Once deposition starts, the heat transfer to the incoming cold air is reduced and a static layer builds up in thickness until it reaches the level of the fuel injectors. When this happens a portion of the fuel condenses within the static layer and forms a solid conglomerate which puts the gasifier out of action. It is thus difficult to operate such a gasifier under part load conditions with cold air supply. A solution to this problem is to preheat the air supply by burning in it enough fuel to raise its temperature to an operating temperature, say 900°C. The air supply can now be reduced down to the initial fluidisation velocity over the whole bed instead of having a velocity ratio gradient within the bed. This allows a turn down ratio of, for example, 4 to 1. However, since the heat transfer to the cooling coil would not be greatly affected by the change in superficial gas velocity, it would be necessary to weaken the fuel/air ratio at the low-flow condition to maintain the operating temperature. This would increase the turn down ratio to about 5 to 1. It is desirable to underfire the bed continuously, under these conditions, which, in any case, may be raised to operating temperature at start up by underfiring. It is not desirable to underfire the regenerator since all the oxygen in its air supply is preferably required for the production of $SO_2$.

It is therefore convenient to split the air supply to the reactor or gasifier into two unequal portions, the major portion being partially combusted before being led to the gasifier bed and the minor portion being led cold to the regenerator bed. Since for a given design of distributor, the pressure drop through the hot distributor will be greater than that through the cold distributor, the flow of air through the regenerator may be conveniently controlled by means of a valve in its air supply line, the bed heights in the gasifier and the regenerator being substantially equal. In the case of the regenerator, a limited degree of defluidization at the bottom of the bed will cause no inconvenience since, in the absence of fuel, no carbon will form, whilst a flow of bed material to the bottom of the regenerator bed from the top of the gasifier bed will ensure a reasonable degree of heat transfer. Under part load conditions the heat released within the regenerator will be reduced and this, unless provided for, would result in a drop in its temperature and in the $SO_2$ content of the effluent leaving it. Since the regenerator operates at temperatures in the region of 1,000° to 1,150°C and the gasifier at temperatures in the range of 800° to 950°C, an increase in the circulation rate of bed material will tend to reduce the regenerator temperature whilst a reduction in the circulation rate of the bed material will tend to increase it. Since under part load conditions the rate of accumulation of sulphur in the bed material is reduced, it will be practicable to reduce the bed material circulation rate so as to keep the sulphur content of the bed material to its normal level. The regenerator temperature may be controlled therefore by varying the circulation rate of the bed material using a high circulation rate under full load conditions and a lower circulation rate under part load conditions. If the air flow to the gasifier and the regenerator remain in constant proportion over the whole range of output then, since the $SO_2$ content of the regenerator effluent is determined by its temperature, this temperature control will keep the gasifier and the regenerator in balance over the whole load range. Should there be any change in the sulphur content of the fuel it will be necessary to adjust the air flow so that fractions of the air supply between the gasifier and the regenerator remain in balance.

If a constant concentration of sulphur dioxide is required from the regenerator, then the proportion of the total air supply which is fed to the regenerator will be determined by the sulphur content of the fuel. The fuel sulphur content is conveniently measured by the sulphur dioxide content of the hot gas under the distributor of the gasifier and this measurement may be used to adjust a proportioning valve to an appropriate discrete setting. Since the sulphur content of the fuel is only likely to change intermittently as fresh loads of fuel are delivered, this control need not be operated continuously and, in fact if the sulphur content of the fuel is known then the setting may be made manually.

It is desirable, for effective operation of the gasifier, that the bed material leaves the gasifier close to its surface on its way to the regenerators and returns to the gasifier near to the bottom of the bed, rather than converse. This is because the oxidising conditions at the base of the gasifier bed cause a certain amount of refluxing of $SO_2$ to occur so that the sulphur content of the fluidised bed material at the bottom of the gasifier bed may be lower than that of the material at the top of the bed and may be in the form of sulphate to some extent, the magnitude of this effect being reduced by suitable measures such as underfiring.

A diagrammatic layout of a gasifier system is shown in FIG. 9. As shown in the drawing, a gasifier 66 is underfired (i.e., heated by firing beneath the distributor) by a self proportioning burner 67 with a 4 to 1 turn down ratio which is actuated by a main load controller 68. The same controller also actuates a control valve 69 for the main fuel supply passing through a pipe 70 to the gasifier, a fuel pump 71 being provided. Since the proportioning burner 67 does not handle all of the air supplied via pipe 72 to the gasifier 66, a secondary air supply pipe 79 is provided, the control valve 80 being actuated by the temperature sensor 81 under the distributor 74. Thus if a constant air supply temperature of, say, 900°C is required this will automatically ensure a constant fuel/air ratio under the distributor and will adjust the total air supply in accordance with the load requirement.

Whilst the fuel supply to the gasifier bed is also controlled by a secondary load control 75, since the gasifier will only desulphurise efficiently over a narrow temperature range, it is necessary to adjust the fuel supply independently according to the temperature. Thus, if the main load controller 68 always provides a slight excess of fuel to the gasifier this will tend to lower its operating temperature but a further throttling valve 76, operated by the bed temperature and controlled by a temperature sensor 86, will tend to redress the balance since a reduction in the fuel supply will cause the bed temperature to rise.

It will be seen that the air supply through pipe 72, assisted by a fan 77, may thus follow two paths, a first part of the air supply passing via a pipe 78 and a second part, passing via pipe 79, controlled by a valve 80 operated by a temperature sensor 81, a portion of the second part of the air passing to the region 73 and beneath the distributor 74 another portion of the second part passing via a pipe 82, to a regenerator 83 via a valve 84 controlled by an $SO_2$ sensor 85. Fluidized bed material 87, in the gasifier 66, passes to the regenerator 83 via a pipe 88 controlled by a flow rate controller 89 under the control of a temperature sensor 90, returning to the gasifier 66 via a pipe 91.

FIG. 9A shows a modified version of the control system of FIG. 9, in which like elements are given like reference numerals. In the FIG. 9A embodiment, the amount of air supplied to the region 73 from pipe 79 is controlled by temperature sensor 81, but the air flow to the region 73 is through a T-piece (or the equivalent) leading off line 79. The ultimate control of the air flow to the regenerator is from a sensor 85 in the gas off-take duct from the regenerator 83. Preferably, the sensor 85 measures $SO_2$ concentration in the regenerator off-gas, and if the $SO_2$ concentration falls below a designed concentration (say 10 vol%) indicating a reduction in the amount of regenerable sulphur-containing material, the valve 84 is progressively closed until the design $SO_2$ concentration is reached. The sensor 85 may alternatively measure oxygen concentration: in this case, an excess of oxygen in the off-gas is indicative of a reduction in the regenerable sulphur-containing material and the valve 84 is closed to reduce the air input until the oxygen content of the off-gas is on target again. However, it is preferred to sense $SO_2$ rather than oxygen since although meters for measuring the concentrations of both of these gases are available, the $SO_2$ meters are more sensitive.

It will be appreciated that start up of the two previously described embodiments is simply achieved by underfiring using the burner 67 and sufficient air from valve 80 to achieve circulation of the bed material until the minimum working temperature is achieved.

In another form of control system for fluidized bed desulphurizing a simple control uses gas recycle for temperature control and turn down control. In this form of the invention the total flow rate of gas is held constant but the oxygen available for combustion is reduced or diluted by the flue gas. This may be done by recycling flue gas through the gasifier obviating the necessity to preheat the the air supply to the distributor in order to operate under part load conditions. Start up of desulphurizers of this type is effected by overfiring as explained herein in relation to FIGS. 11 and 12.

When flue gas recycle is used, a simple arrangement is to pipe the gas to the inlet side of a blower providing the gasifier with air and to use a suitable valve in order to control the ratio of flue gas to air which enters the blower and is delivered to the gasifier. The valve setting may be controlled directly by the load on the boiler as reflected, by for example, temperature of steam entering a turbine or by the water temperature in a central heating system, e.g., as the load goes down the water temperature will rise and in response, the gas valve will open and more flue gas will enter the gasifier with a consequent reduction in the amount of oxygen available for gasification. With this method of output control, the temperature of the gasifier may be controlled independently by means of the fuel supply. For example, if the arrangement is such that the gasifier operates at, say, 900°C and 30 percent stoichiometric air at full load, then when the load is reduced the heat released in the gasifier will also be reduced due to reduction in available oxygen, the heat losses remaining constant and heat being absorbed by the recycled gas. A fall in gasifier temperature will cause the fuel supply to be reduced and this will tend to raise the bed temperature and the operation will stablise on part load at some stoichiometric ratio which is greater than 30 percent.

Since it is desirable to maximise the $SO_2$ concentration in the gas leaving the regenerator it is necessary to use an undiluted air supply in this case and a separate blower will be required for the purpose. It is undesirable for the air supply to the regenerator to be held in proportion to the fuel supply to the gasifier, consequently the two control valves may be operated by the same signal. On the other hand, the constant of proportionality will depend on the sulphur content of the fuel oil and this may be adjusted by bleeding air upstream of the control valve. Temperature control within the regenerator may be obtained by varying the bed material recycle rate, it being so arranged that the regenerator temperature is maintained at the lower end of the load range. An amplifier for the whole system can conveniently be a multipoint temperature recorder. This can be provided with relays actuated by the printing mechanism which will operate motorised control valves through incremental adjustments when the recorded temperature falls either side of a chosen "dwell" band. Such an arrangement will give a floating set point for a fuel control valve, the regenerator air supply and the fluidised bead material circulation rate. Alternatively individual controllers may be employed. The flue gas recycle valve may be operated by proportional control and be activated directly by changes in load. Since this is the main control it needs to have the fastest response. The secondary air supply to the gas burner also needs to be varied over the load range and this could similarly be actuated directly by changes in the fuel rate.

FIG. 10 schematically illustrates a gasifier system using flue gas recycle. In this form of the invention the total flow rate of the gas is held substantially constant and temperature control is exercised by reducing the amount of oxygen available for combustion by recycling flue gas (obtained from the combustion of the sulphur-free fuel gas product of the gasifier) through the gasifiers. Thus flue gas is recycled via a pipe 104, and mixes in a pipe 105, with air supplied through a pipe 106, under the control of an air supply controller 103 which acts on an air/flue gas proportioning valve 107. The setting of the controller 103 is determined by the water or steam temperature in the boiler heated by the fuel gas product, and a signal representative of this temperature is passed to the controller from the boiler along signal line 102. The mixed air/flue gas stream passes through a pipe 108 and fan or blower 109 to a gasifier 110, entering the gasifier in zone 111 below the distributor 112 and fluidised bed 113. Fuel is delivered to the gasifier 110 through a pipe 114 under the control of a control valve 115 and controller 116 responsive to a temperature sensor 117. Fluidised bed material 113 is transferred from the gasifier 110 via a pipe 118 to a regenerator 119 its flow being controlled by a controller 120 (diagrammatically shown) responsive to a temperature sensor 121; regenerated material returns to the gasifier 110 through a pipe 122. The controller 120 may operate pneumatically as hereinbefore described, or it may operate mechanically: thus, the controller 120 may comprise an Archimedian screw, the rate of rotation of which is dependent on the temperature sensed by sensor 121. Alternatively, the air/flue gas proportioning valve one of seven may respond to a signal indicative of the rate of fuel injection into the reactor bed.

Secondary air for the complete combustion of the gasified fuel is delivered by a third fan (not shown) which is controlled by a fuel valve controller 123. A fan or blower 125 provides air for the regenerator 119 and a bleed valve 126, in an air bleed line 127, serves to adjust for the sulphur content of the fuel. The setting of the fuel valve controller 123 regulates the degree of opening of a valve 124 in the regenerator air line so that the rate of air flow is in a substantially fixed proportion to the fuel flow rate.

FIG. 10A illustrates a gasifier generally similar to that shown in FIG. 10, the principal difference being that valve 124 in the regenerator air-line is controlled by the sulphur dioxide concentration in the regenerator off gas, in the same manner as in the embodiment shown in FIG. 9A.

FIG. 11 shows diagrammatically a fluidized bed boiler system operated in accordance with the invention to produce useful heat and substantially sulphur free flue gas.

The boiler system comprises a reactor 200 in which full combustion of the fuel is effected and a regenerator 201 in which the sulphur removing activity of the particles in the fluidized bed 202 of the reactor is restored by subjecting the particles to regeneration in a bed 203. Transfer of particles from the reactor bed 202 and the regenerator bed is effected by transfer pipe 204 which extends downwardly from a pocket or recess 205 into which particles from the region of the top of the bed 203 splash, to a region adjacent the bottom of the regenerator bed 203. At suitable intervals, pressurized air from a source (not shown) is injected via pipe 206 into the horizontal bottom section of pipe 204. A regulator and control valve 207 to regulate the injection of pressurized air opens and closes at intervals which are dependent on the rate of supply of fuel to the reactor bed 202. The pressurized air pneumatically transports particles into the bed 203 while the mass of particles in the transfer pipe 204 above the pipe 206 prevents any substantial flow of gas from the regenerator 201 to the reactor 200. As will be seen, a similar system is employed for transferring particles from the region of the top of the regenerator bed 203 to the bottom of the boiler bed 202 via pipe 204a. The particle transfer system will be described in more detail hereinafter.

The reactor bed 202 is supported on a suitable distributor 209 and the regenerator bed is supported on a suitable distributor 210.

Air is supplied to the reactor 200 and regenerator 201 by a blower 211, the air passing via trunking 212 under the distributor 209 of the reactor 200 and from there via trunking 213 to the underside of distributor 210 of the regenerator 201. Fuel oil is injected into the reactor bed 202 from injector pipe 214 adjacent to the region of return of the regenerated particles.

Heat is removed from the bed 202 by one or more immersed coils 215 in the bed 202. The demand for heat is regulated by a controller 216 which monitors the temperature of, e.g., water or steam passing through the coils 215. The setting of the controller 216 regulates the volume of air and rate of oil injection by acting on the air controller 217 and fuel controller 218: the former acts on a throttle valve 219 in the trunking 212, which thereby ensures that the amount of air supplied to the reactor bed 202 is in the correct stoichiometric proportion relative to the fuel supplied from the injector 214.

The fuel burns in the fluidized bed 202 and sulphur from the fuel reacts with alkaline earth metal oxide, e.g., lime to form calcium sulphate.

The temperature in the bed 202 is maintained at from 800°–950°C by any suitable expedient such as increasing or trimming the coolant flow rate through the coils 215. However, in the illustrated embodiment, a thermocouple 221 detects any changes in temperature and actuates a trimming valve 222 to reduce the fuel supply when the temperature is excessive, the fuel controller 218 being so set that a slight excess of fuel for the required heat demand is provided. The air supply to the reactor 200 is always in excess of the stoichiometric requirement so that if additional fuel is injected, there is always sufficient air for its full combustion.

Substantially sulphur free flue gas leaves the top of the reactor 200 and is freed from entrained fines by passage through a cyclone 223, and the flue gas escapes to a stack, optionally giving up more heat in other heat exchangers such as economisers and/or air preheaters, via trunking 224.

The fines which separate from the flue gas in the cyclone 223 contain regenerable quantities of sulphur compounds and they are therefore fed to the regenerator by means of a dipleg 225 the lower end of which terminates in a pocket around the horizontal section of the transfer pipe 204 so that as particles are pneumatically transported from the pipe 204 into the regenerator bed 203 as hereinafter described, the fines are admixed in the moving particles and carried with them into the regenerator bed 203.

The quality of the flue gases leaving the reactor 200 is analyzed by a sulphur dioxide sensor 226 of any suitable type. If the flue gases contain an amount of $SO_2$ indicating that more than 1% of the fuel sulphur is escaping from the bed a signal is generated by the sensor 226 which, after suitable amplification, causes the double-bell mouth 227 of a hopper 228 to open and thereby discharge from the hopper 228 a quantity of particles of active lime (i.e., lime produced by calcination below 1,200°C or of particles of a precurson thereof such as limestone or dolomite). Other controllable particle feeding devices (not shown) may be employed in place of the double-bell arrangement 227 — a suitable alternative is a vibrating belt. As an alternative or in addition, the $SO_2$ sensor 226 may also act upon the valves 207 to cause them to increase the rate of transfer of particles between the reactor bed 202 and the regenerator bed 203.

In order to maintain the amount of material in the two beds 202 and 203 substantially constant, a pressure switch 229 responsive to the pressure in the bed 202 causes a bleed valve 230 to open whereby particles from the oxygenated zone just above the distributor are discharged until the pressure sensed by the switch 229 falls to a predetermined maximum desired pressure. The sulphur content of the dumped material is not likely to be high since it is bled from a region below the level of injection of the fuel and in which temperatures are generally too low for any reaction to take place to any substantial degree.

The regenerating gas in the regenerator 201 is formed by injecting into the regenerator a fuel which may, for convenience, be the same fuel which is combusted in the reactor 200, and supplying substoichiometric quantities of air so that a reducing atmosphere prevails in the regenerator bed. For most operations, an optimum amount of air is about 55 percent of the stoichiometric requirement to reduce metal sulphate to the oxide with the release of $SO_2$, the temperature of operation being between 1,000° and 1,1150°C and carbon lay-down on the regenerator bed particles being at an acceptable level.

The fuel oil is injected by a metering pump 232 at a rate which is governed by a signal from an air flowmeter 233 which maintains the 55% stoichiometric air rate.

The gases leaving the regenerator 201 are analyzed for $SO_2$ content by an $SO_2$ sensor 234 before passage through a cyclone 235 to remove entrained fines. The thus removed fines are rejected via a dipleg 236 and the solids-free gases leave the system via line 237. From a practical point of view, it is preferred that the $SO_2$ content of the gases in line 237 should be as high as possible. It is feasible to arrange that the $SO_2$ content is as high as 15 percent of the gases, but for most operations, 10 percent is a suitable concentration to maintain.

It is preferred to fire the regenerator 201 at such a rate that sulphur is removed therefrom as $SO_2$ slightly faster than it is supplied thereto as reacted particles from reactor bed 202. Thus, the $SO_2$ content of the regenerator off-gases is slightly lower than it could be, and the sensor 234 can react to increases in $SO_2$ content above this "dilute" level by causing the air controller 239 to increase the air rate and the corresponding fuel rate to bring the $SO_2$ content down to the desired slightly "dilute" concentration. The maximum sulphur throughput will occur when high sulphur fuel oils are employed: these are unlikely to have a sulphur content much in excess of 4 wt. percent.

If the $SO_2$ content of the off-gases as measured by the sensor 234 falls, the only likely cause is that the sulphur content of the materials in the regenerator bed 203 has fallen. A signal is sent from the sensor to an air-flow controller 239 downstream of the flowmeter 233 causing the controller 239 to reduce the air flow rate: as the air-flow rate is reduced, the flowmeter 233 signals the fuel metering pump 232 to reduce the input of fuel to maintain the stoichiometric setting, and accordingly the amount of reducing gas produced in the regenerator bed 203 is decreased so that the $SO_2$ in the regenerator off gas is substantially maintained at the required concentration (e.g., 10 percent).

It is found that for part load operation of the system, the regenerator bed temperature tends to be lower than for full load operation since the heat losses from the regenerator 201 remain approximately constant during all modes of operation while the heat produced by the part combustion of the fuel falls as less fuel is injected. If the temperature falls, the amount of sulphate decomposed to $SO_2$ is reduced and the $SO_2$ sensor 234 will further reduce the flow of air (and consequently of fuel) to the regenerator by means of an appropriate signal to the air flow controller 239. This situation can lead to a progressive shut-down of the regenerator 201 as the superficial gas velocity through the bed is reduced.

This tendency towards progressive shut down is avoided by arranging that there is a preset minimum level of throttling of the air supply rate and hence a minimum supply rate of fuel to the regenerator which maintains the bed 203 in a fluidized condition at a reasonable temperature — say, about 1,050°C.

To avoid excessively high temperatures at high firing rates of the regenerator bed 203, the temperature in the bed 203 is monitored by a thermocouple 241, and at excessive temperatures (e.g., in excess of 1,130°C), a controller 242 progressively opens a valve 243 in a diluent supply line 244 in response to the excess temperature. The diluent may be any fluid which can act as a temperature regulator, and it may be cooled recirulated flue gas from the reactor 200. However, since the diluent gas will affect the $SO_2$ concentration sensed by the $SO_2$ sensor 234 and possibly cause an undesirable reduction in firing rate, the preferred diluent is a fluid which can be condensed from the gas shunt to the $SO_2$ sensor 234; a suitable fluid is therefore steam injected below the distributor 210 as shown, or water which could be injected as a fine spray either below or above the distributor 210.

The relative sizes of the reactor 200 and regenerator 201 are shown to a grossly distorted scale in FIG. 11 for the sake of ease of illustration. The types of fuel oil which are likely to be burned in the reactor 200 will mainly have a sulphur content in the range of 2 to 4 wt. percent i.e., an average of about 3 wt. percent. The combustion of a fuel oil having a sulphur content of 3 wt. percent normally yields a fuel gas having an $SO_2$ content of about 2,000 ppm. The operation of the system of FIG. 11 should produce an off-gas from the regenerator having an $SO_2$ content of 10% (i.e., 100,000 ppm). Accordingly, if the reactor and regenerator operate at the same pressure, the cross-sectional area of the regenerator need only be one-fiftieth of that of the reactor 200.

When the boiler system of FIG. 11 is to be started up from cold, it is not easily possible to inject fuel directly into the reactor bed 202 or the regenerator bed 203 until the mass of bed material therein has been heated to a temperature of which the fuel will burn without excessive cracking to tar and coke. A suitable minimum temperature for the bed material is about 650°–750°C in the reactor and about 800°–900°C in the regenerator.

A simple and effective way to heat the bed material at least to its operating temperature is to burn a fuel from one or more injectors just above the expanded level of the beds with the flames playing on the top of the beds while sufficient air is blown through the beds to fluidize at least a major proportion of the material therein so that there is sufficient particle circulation in each bed to permit a fairly rapid and thorough heating of the beds. The fuel employed may be any convenient fuel such as natural gas or a natural gas product, coal gas, light oil or fuel oil. In FIG. 11, a fuel injector 260 is shown in the reactor 200 and a fuel injector 261 is shown in the regenerator. The rate of warm-up can be increased by recirculating some of the flue gas produced by burning the fuel at the injectors 260 and 261.

An embodiment of the preferred particle transfer system of FIG. 11 which is also preferred for all the boilers and gasifiers of the invention is shown in FIGS. 11a and 11b.

Compressed air is supplied from a pump to a storage tank S via a pressure regulating valve V. The compressed air from tank S passed to a valve 207b the opening and closing of which is under the control of a regulator 207a. The regulator 207a receives signals of the fuel supply rate to the reactor 200 from a meter (not shown) in pump unit 218 via signal line 218a, and if the fuel flow increases, the regulator 207a causes the valve 207b to open and close at an increased frequency, the period when the valve 207b is open being substantially constant and the periods when the valve 207b is closed being varied. Similary if the fuel flow decreases, the opening and closing cycle of the valve 207b is decreased in frequency by lengthening the period of closure.

Thus, intermittent blasts of compressed air are blown from valve 207b through pipe 206 into the horizontal section of the pipe 206c which forms the entry to the regenerator 201. The pipe 206c forms an outlet from a mixing pocket 206b into the top side of which particles from the pipe 204 pass. It will be seen that the top side of mixing pocket 206c rises to a peak, and that the dipleg 225 enters the pocket 206b below the peak. The pipe 204 will be filled with particles which have splashed into the pocket 205 from the reactor bed 202. At each blast of compressed air from pipe 206b, particles in the pocket 206c are pneumatically transported into the regenerator bed 203 via the pipe 206c. As well as transporting particles from the pipe 204, the blast also enables fines from the dipleg 225 which enter the pocket 206b to be admixed with coarser particles from pipe 204 in the pocket 206b.

The transport of the material is enhanced by a certain degree of fluidization, but the fluidization is generally confined to the pocket 206b due to the mass of material in pipe 204 above the pocket and due to the tendency of coarse particles in the pocket 206b to obstruct the passage of air into the dipleg 225. The vertical wall of the pocket 206b facing the regenerator 201 enhances the mixing of coarse and fine particles. It is preferred to inject a small quantity of gas into the left hand sloping side of the pocket 206b to reduce the stick-slip viscosity of particles. The gas for this is injected through tube 206a, and the injection may be continuous or it may be provided intermittently in synchronism with the air blast from pipe 206 by providing a connection between pipe 206 and 206a.

In order to maintain the pipe 204 substantially full of relatively coarse particles, the volume of the pocket 205 is preferably greater than the gross volume of particles transported by each blast of air, and the height of the pocket 205 relative to the top of the bed 202 must be selected to be a compromise between a maximum height at which the rate of particle splashing is too low to maintain sufficient material in the pocket 205 for adequate transfer rates to the regenerator and minimum height at which the head of particles in pipe 204 is insufficient to prevent a backflow of particles at each blast of compressed air.

It will be appreciated that a system as shown in FIGS. 11a and 11b is also used for returning particles from the regenerator 201 to the reactor 200.

The boiler system of FIG. 12 is an adaption of the principles of the boiler system of FIG. 11 for use in a large boiler which is designed to meet substantial fluctuation in load. Items which are common to the boilers of FIGS. 11 and 12 have been given the same reference numerals.

The main difference between the boilers of FIGS. 11 and 12 resides in the constructon of the reactor 200. In FIG. 12, the distributor 209 is divided into three separately operable parts 209a, 209b and 209c by dividing the space beneath the distributor into three modular chambers 250a, 250b and 250c by means of two vertical walls 251, 252. Each chamber 250a, 250b, 250c is supplied with air from a respective valve 219a 219b, 219c: thus, if air is supplied only to chamber 250c, valve 219c being the only open valve 219, only particles in the bed 202 which are above distributor part 209c will be fluidized, and the fluidized part of bed 202 (herein designated "module 202c") acts as a combustor for fuel oil injected into module 202c independently of the state of activity of the other bed modules 202a and 202b. Each bed module has its own immersed set of heat exchange coils 215a, 215b, 215c and its own set of temperature controls 221, trimming valves 222, fuel injectors 218 and air-fuel ratio controllers 217: these items are shown only for bed module 202a for simplicity.

The reactor 200 can therefore be operated using one, two or three bed modules, depending on the load as set by the controller 216. The controller 216 incorporates a programmer whose construction will be appreciated by those skilled in the art and which ensures that the bed modules are operated only in the following combinations: 202c only; 202c + 202b; 202c + 202b + 202a. The reason for operating as aforesaid is to ensure that bed material which is used for sulphur adsorption should be transferrable to the regenerator bed 203, and for such transfer to take place, the reactor bed module adjacent the transfer pocket, i.e., module 203c, must be in a fluidized state, and any other bed module which is used must be adjacent module 202c, i.e., module 202b or it must be adjacent module 202b and 202c when the two latter are fluidized so that bed material from active parts of the bed is always capable of migrating to the pocket 205. Similar considerations apply for the distribution of regenerated material from the regenerator bed 203 to active parts of the reactor bed 200.

The controller 216 regulates the supply of air and fuel to the active module(s) of the bed 202 in such a manner that, as in the embodiment of FIG. 11, the minimum air supply to an active bed module is at least sufficient to prevent a substantial degree of defluidization, and as in the FIG. 11 embodiment, if the heat demand from a particular module falls to such a low value that substantial defluidization will occur, the air supply (and correspondingly the fuel supply) to that module is stopped and the module inactivated. The programmer of the controller 216 also ensures that heat exchange fluid (e.g., water and/or steam) is passed only to heat exchange coils 215 which are in an activated bed module by sending an appropriate control signal to the respective circulation valves 216a, 216b, 216c.

The relative sizes of the reactor 200 and the regenerator 201 are preferably governed by the same principles explained in relation to the FIG. 11 embodiment, and in a preferred, but not mandatory, construction, the relative cross-sectional areas of the whole reactor bed 202 and the regenerator bed 203 are in the ratio 50:1. It will be appreciated that if only one bed module is active (i.e., module 202c), the mass flow-rate of air and fuel into module 202c will be at most one third of the mass flow rate of air and fuel when all the reactor bed 202 is active. The rate of transfer of particles from module 202c to the regenerator will be governed by the fuel input rate to the reactor and will therefore be about one third of the maximum rate. The concentration of sulphur in the material transferred to the regenerator bed 203 will therefore be about the same as it would be with full operation to the reactor 202, but the rate of transfer of sulphur containing material to the regenerator 201 will be about one third of the rate during full reactor operation.

In these circumstances, the rate of supply of air (and fuel) to the regenerator 201 will fall to a value of about one third of its full rate since the $SO_2$ sensor will indicate a fall in $SO_2$ concentration if the full air and fuel rate are maintained: if there is an excessive decrease in temperature in bed 203 as indicated by the thermoprobe 241, a signal to controller 242 will cause valve 243 to open to an appropriate degree causing the admission of a diluent fluid, such as water or steam to prevent a progressive shut-down of the regenerator as hereinabove discussed.

It will be appreciated from the foregoing description that whereas the FIG. 11 embodiment is able to provide heat outputs for which the required air and fuel supply rates give a superficial velocity in the reactor bed 203 which at a maximum is just below the velocity which would cause entrainment of an undesirable proportion of the particles from the bed (e.g., 10 feet/sec. where the particle size is mainly in the range ⅛ – 1/16 inch) and lead to overloading of the cyclone 223, and at a minimum would be just above the velocity at which defluidization of the bed 202 would be significant (particularly in impairing satisfactory air distribution and circulation of particles in the bed 202), the FIG. 12 embodiment is capable of providing heat outputs ranging from a maximum determined by excessive entrainment from three bed modules 202a, 202b and 202c to a minimum determined by significant defluidization during operation of bed module 202c alone. Thus the heat output in the FIG. 11 embodiment can vary by a factor (the so-called "turn-down ratio") of about 2.5:1, for a reasonable size and loading of the cyclone 223, whereas the turn down ratio of the FIG. 12 embodiment is about three times as much, i.e., about 7.5:1.

Although not shown, it is within the ambit of the present invention that each bed module of the reactor 200 may have a respective regenerator 201.

In the oxidising method of absorption control, heat transfer may be controlled independently of combustion rate. This enables the boiler to be started quickly and allows for the incorporation of a heat store which will deal with sudden lead fluctuations. The arrangement is particularly adapted for peak lopping power generation.

Generally it is convenient when complete combustion occurs within the fluidized bed that the heat transfer surfaces should be immersed within the fluidized bed in order to take advantage of high rates of heat ransfer obtainable within this environment. In these circumstances however, unless special steps are taken to reduce the heat transfer rate on starting, it may be difficult to bring the boiler on load without intense overfiring. Even when the heat transfer rate is reduced by suitable means, a considerable mass of bed material has to be brought up to temperature before the bed can be used as a combustor and this prolongs the starting time. Another disadvantage of immersed heat transfer surfaces is that the optimum heat transfer rate is obtainable at relatively low gas velocity and this requires a large hearth area.

In this modification a high gas velocity combustor is used which also serves as a solid transfer pump, heat being removed from the combustor by the flow of solids through it in the same direction as the gas stream. Suitable means are used to separate the hot solids from the combustion gases and the particles are then allowed to flow by gravity down one or more return pipes to the distributor of the combustor. Means are available to control the rate of solids flow down the, or each, return pipe, and the latter can contain a suitable heat transfer surface which will remove heat from the flowing solids. Since the heat transfer is counter current this arrangement is especially advantageous when super-heated steam is being raised. Part load operation may be dealt with by de-activating a proportion of the return lines, and high level pockets which contains no heat transfer surfaces may be used as a heat exchanger to reduce the temperature of the stack gases. Since no combustion will occur in this bed it can run at a very low temperature, say 350°C against a minimum temperature of 800°C for the combustor.

FIG. 13 illustrates a fluidized bed boiler in which heat transfer is controlled independently of the combustion rate. The reactor or combustor 92 which receives fuel through a fuel inlet 103, may be of rectangular form and operate at a gas velocity of, say, around 7 to 10 feet per second at 850°C. At a suitable height above the surface of the bed, as shown at 93, the combustor duct is pinched in order to encourage the carry over of bed material into a pocket 94. This pocket may be in the form of an undivided hopper or it may be subdivided into sections by vertical partitions as shown, and each section provided with two down-comers, one shown at 95, inclined, the other shown at 96 vertical controlling the flow of bed material. As depicted in FIG. 13, the control and transfer of bed material is effected pneumatically by the system 206', 207' described in relation to FIGS. 11a and 11b, and the rate of transfer of material is related to the rate of fuel injection and ultimately to the boiler load, in the same manner as in the embodiment of FIG. 11.

The inclined passage 95 returns bed material from the pocket 94 of the combustor without extracting any heat in the process. This enables the material in the pocket 94 to be turned over so that the pocket may be used in a heat store. The vertical down-comer 96 incorporates a heat exchanger consisting of two concentric tubes 97, 98, the inner tube 97 being stayed with horizontal cross tubes 99 so that its surface area is extended and the bed material flowing down mixes as it flows so that fresh particles continually meet the heat exchanger surfaces. A top bed, 100, can operate at a relatively low temperature, say 350°C, and can be used to preheat the feed water, passing to the boiler through heat exchanger tubes 101 immersed in the bed 100. By choosing a suitably large plan area, the gas velocity in the bed 100 can be made low enough, 1 to 2 feet per second, to avoid the necessity for cyclones and the bed material can be limestone since any lime entering this bed will be recarbonated. This bed need only be deep enough to immerse the heat exchanger tubes 101, say to a depth of 6 inches. The combustor may be started by underfiring its distributor 102, or overfiring the bed material, in the manner hereinbefore described during the start up period, all down-comers being inoperative so that there is no turn over of bed material in the combustor. Part load operation may be obained by running a suitable proportion of the vertical down-comers 96 but during this condition the bed material in the remaining pockets may be brought up to running temperature so that a rapid response to load increases becomes available.

The present invention has heretofore been described in relation to the gasification or combustion of fluid fuels, such as fuel oil. However the invention may also be applied to solid fuels, either alone or in a slurry with a liquid which may itself constitute a fuel, such as fuel oil.

In the treatment of solid hydrocarbon fuels, e.g., coals, which may contain a large proportion of ash e.g., 20 percent by weight or more, means must be provided for removing ash from the process without a substantial loss of fluidized bed material. It has been found that coal containing at least 24 percent by weight of dolomite can be burned in a fluidized bed without sintering, under the reaction conditions previously mentioned, and that at temperatures, in the range of 800°–950°C, coal ash particles will not tend to adhere to particles constituting the fluidized bed. It is preferred that coal to be burned in a fluidized bed is sized so that its ash particles are substantially smaller than those of the fluidized bed material; suitable means, e.g., a low efficiency cyclone, may be used to retain fluidized bed particles in the combustion chamber whilst allowing the ash particles to escape and these may be removed from the flue gas by known means. The coal may be introduced to the fluidized bed, or beds, in known manner, for example, by pneumatic transport, or a mixture of coal or hydrocarbon may be used, e.g., as a coal/oil slurry.

What is claimed is:

1. A method of removing sulphur from a sulphur-containing fuel in which the fuel is passed to a reactor having a gas distributor at its base and containing a bed of particles comprising alkaline earth metal oxide at an elevated temperature fluidised by an upwardly flowing stream of free oxygen containing gas supplied through at least part of the said distributor, the fuel being at least partially burned with the oxygen in the part of the reactor bed above the said part of the distributor, and sulphur in the fuel reacting with the said alkaline earth metal oxide to form solid compounds comprising sulphur and alkaline earth metal thereby converting the fuel into a substantially sulphur-free product which leaves via the top of the reactor, transferring particles continuously from the fluidized bed in the reactor to a regenerator wherein a bed of particles is contained and fluidized by an upwardly flowing stream of a regenerating gas which converts at least some of the said solid compounds comprising sulphur and alkaline earth metal to alkaline earth metal oxide with the release of sulphur dioxide, transferring particles continuously from the fluidized bed in the regenerator to the reactor at approximately the same rate as the rate of transfer of particles from the reactor to the regenerator, regulating the rate of supply of fuel to the said part of the reactor, regulating the rate of supply of the free oxygen containing gas to the said part of the reactor above a lower limit such that the superficial velocity of gas in the reactor is sufficiently high to prevent any substantial defluidisation of particles in the reactor bed above at least the said part of the distributor through which said oxygen-containing gas is supplied, deriving a signal representative of temperature in the reactor bed and maintaining the temperature in the reactor bed substantially within the range 800°–950°C in response to the temperature representative signal, deriving a signal representative of the temperature of the regenerator bed and maintaining the temperature in the regenerator bed substantially within the range 1,000°–1,150°C.

2. A method according to claim 1 in which the rate of supply of free oxygen containing gas to the reactor is substoichiometric relative to the rate of supply of fuel to the reactor whereby the fuel is converted into substantially sulphur free combustible gases at a reactor bed temperature of 800°–950°C, the regenerating gas comprising free oxygen, and the rate of supply to free oxygen to the regenerator bed being sufficient to maintain the temperature in the regenerator at from 1,000°C to 1,150°C and to regenerate alkaline earth metal oxides with the release of $SO_2$, the supply rate of oxygen in the regenerating gas being regulated in accordance with the sulphur content of the fuel and in accordance with the rate of supply of the fuel to the reactor whereby the gas produced in the regenerator has a substantially constant $SO_2$ and/or $O_2$ content.

3. A method according to claim 1 in which the rate of supply of free oxygen containing gas to the reactor is substoichiometric relative to the rate of supply of fuel to the reactor whereby the fuel is converted into substantially sulphur free combustible gases at a reactor bed temperature of 800°–950°C, the regenerating gas comprising free oxygen, and the rate of supply of free oxygen to the regenerator bed being sufficient to maintain the temperature in the regenerator at from 1,000°C to 1,150°C and to regenerate alkaline earth metal oxides with the release of $SO_2$, the concentration of $SO_2$ in the gas produced in the regenerator being monitored and the rate of supply of the regenerating gas being regulated so that the concentration of $SO_2$ in the gas produced in the regenerator is substantially constant.

4. A method according to claim 2 in which a flue gas obtained by the full combustion of part of the substantially sulphur-free combustible gas produced in the reactor is admixed with the free oxygen containing gas to maintain the superficial velocity of gas in the reactor bed above the said lower limit, the amount of free oxygen containing gas in the mixture being regulated with the amount of fuel supplied to the reactor in accordance with the amount of combustible gas required.

5. A method according to claim 3 in which the superficial velocity of gas in the reactor bed is maintained above the lower limit by fully combusting some of the sulphur containing fuel with some of the free oxygen containing gas whereby to produce hot combustion gases containing $SO_2$, mixing the hot combustion gases with the remainder of the free oxygen containing gas whereby to form a hot gas comprising free oxygen and $SO_2$, supplying the hot gas to the reactor bed, and supplying sulphur containing fuel to the reactor bed at a rate sufficient to produce the required amount of substantially sulphur free combustible gas at a bed temperature of 800°–950°C.

6. A method according to claim 5 in which the $SO_2$ content of the hot gas mixture is monitored, and the rate of supply of free oxygen containing gas to the regenerator regulated in accordance with the $SO_2$ content of the said hot gas mixture.

7. Apparatus for producing a substantially sulphur-free combustible gas from a sulphur-containing fuel comprising a reactor vessel having a bottom and an orificed gas distributor spaced above the bottom, a bed of fluidizable particles comprising alkaline earth metal oxide supported on the distributor, and a combustible gas off-take above the bed of particles, means for injecting the sulphur-containing fuel into the bed, means for supplying a free oxygen containing gas to the space between the bottom and the distributor for distribution into the bed, means responsive to the temperature in the bed to adjust the relative rate of fuel supply rate with respect to the rate and concentration of oxygen supplied to the bed with the free oxygen-containing gas by relatively reducing the rate of fuel injection with respect to the rate and proportion of oxygen supplied with said oxygen-containing gas when the bed temperature falls toward 800°C, and by relatively increasing the rate of fuel injection with respect to the rate and proportion of oxygen supplied with said oxygen-containing gas when the bed temperature increases towards 950°C whereby during operation, the reactor bed temperature is maintained in the range 800° to 950°C, the fuel being converted to substantially sulphur-free combustible gases, and the sulphur from the fuel combining in the particles to form solid sulphur compounds of alkaline earth metals, a regenerator vessel having a bottom and an orificed gas distributor spaced above the bottom, a bed of fluidizable particles supported on the distributor, means for transferring particles from the bed of fluidizable particles in the reactor to the bed in the regenerator at a controllable rate and means for transferring particles from the bed of particles in the regenerator to the bed in the reactor, the rates of particle transfer in each direction being approximately equal, means responsive to the temperature in the regenerator bed to cause the rate of transfer of particles between the reactor and regenerator to increase with increase in temperature and to decrease with a decrease in temperature whereby to maintain a temperature of 1,000°–1,150° in the regenerator bed, during operation, means for supplying a free oxygen-containing gas into the regenerator bed through the distributor of the regenerator whereby to regenerate alkaline earth metal oxide with the release of gases containing $SO_2$, an off-take for said gases above the regenerator bed, and means for regulating the rate of supply of free oxygen containing gas through the regenerator bed in accordance with the rate of supply of sulphur in the sulphur-containing fuel to the reactor.

8. Apparatus according to claim 7 in which the means for regulating the rate of supply of oxygen containing gas through the regenerator comprises means responsive to the rate of injection of sulphur-containing fuel to the reactor bed, and control means which are adjustable for the sulphur content of the fuel.

9. Apparatus according to claim 7 comprising valve means for mixing oxygen containing gas and flue gas (obtained by combustion of the substantially sulphur-free combustible gases produced in the reactor) in desired proportions and amounts whereby to maintain the superficial velocity of gas through the reactor bed above the velocity at which substantial defluidization of particles will occur in the bed, the valve means responding to a signal indicative of the rate of fuel injection into the reactor bed.

10. Apparatus according to claim 8 having heating means for heating part of the oxygen containing gas supplied beneath the distributor of the reactor, said heating means comprising a burner for burning a variable proportion of the sulphur-containing fuel with some of the cool oxygen containing gas and for causing mixing of the resulting combustion gases with the remaining cool oxygen-containing gas whereby to form a hot gas mixture containing oxygen and thereby provide an increased superficial velocity of oxygen containing gas through the reactor, and means responsive to the temperature of the hot gas mixture to vary the amount of cool oxygen containing gas whereby the temperature of the hot gas mixture maintains the reactor bed at a temperature of 800°–950°C.

11. Apparatus according to claim 10 comprising means for sensing the $SO_2$ content of the said mixture of gases, and means responsive to the $SO_2$ content thereof for regulating the rate of supply of the free oxygen containing gas to the regenerator.

12. Apparatus according to claim 7, comprising means for sensing the $SO_2$ content of the gases leaving the regenerator and means for regulating the supply of oxygen containing gas to the regenerator to maintain a selected concentration of $SO_2$ in the regenerator off gases.

13. A method according to claim 1 in which the rate of supply of oxygen in the free oxygen containing gas supplied to the reactor is at least sufficient for complete combustion of the fuel whereby the fuel is converted to substantially sulphur free flue gases with the generation of heat and the conversion of at least some of the alkaline earth metal oxide to alkaline earth metal sulphate, maintaining the temperature in the reactor bed at between 800° and 950°C by sensing the temperature in the bed and varying the amount of fuel combusted in the bed, removing heat from at least a selected amount of hot reactor bed particles by circulating a heat removing fluid in indirect heat transfer relationship with the selected amount of particles at a rate which is correlated with the rate of fuel combustion in the reactor, and regenerating alkaline earth metal oxide from the alkaline earth metal sulphate with the release of $SO_2$ employing a reducing gas made by combusting a fuel in the regenerator bed with a free oxygen containing gas comprising between 40 percent and 80 percent of the stoichiometric oxygen requirement for full combustion of the fuel, and regulating the rate of transfer of particles between the reactor bed and the regenerator bed.

14. A method according to claim 13 in which the concentration of $SO_2$ in the gases leaving the regenerator bed is sensed, and the rate of supply of oxygen and fuel to the regenerator bed varied whereby the amount of reducing gas formed in the regenerator bed is increased when the $SO_2$ concentration increases and is decreased when the $SO_2$ concentration decreases.

15. A method according to claim 13 in which the temperature in the regenerator bed is sensed, and a coolant fluid is passed through the regenerator bed when the temperature approaches 1,150°C.

16. A method according to claim 13 in which the $SO_2$ content of the flue gases is sensed, and fresh particles comprising alkaline earth metal oxide added to the reactor bed when the said $SO_2$ content is higher than a selected maximum content.

17. A method according to claim 13 in which the heat exchange fluid is circulated at a desired rate only through heat exchange tubes immersed in those parts of the reactor bed which are fluidized and in which fuel is being combusted.

18. A method according to claim 13 in which hot particles from the reactor are transferred to a temporary storage zone, and at least some of the hot particles in the temporary storage zone are passed in indirect heat transfer relationship with the heat exchange fluid whereby to heat the fluid, and the particles are thereafter returned, to the fluidized reactor bed, and at least some of the remaining hot particles in the temporary storage zone are transferred directly to the reactor fluidized bed without heat exchange.

19. A method according to claim 19 in which the return of particles to the fluidized reactor bed after transfer of heat to the heat removing fluid is effected pneumatically at a rate which is dependent on the rate of heat removal by the fluid.

20. Apparatus for burning a sulphur-containing fuel to produce useful heat and a substantially sulphur-free flue gas comprising a reactor vessel having a bottom and an orificed gas distributor spaced above the bottom, a bed of fluidizable particles comprising alkaline earth metal oxide supported on the distributor, a flue gas off-take above the bed of particles, means for injecting the sulphur-containing fuel into the bed, means for supplying a free oxygen containing gas to at least a selected part of the space beneath the distributor for fluidizing the particles above the bed, means for regulating the rate of supply of oxygen relative to the fuel so as to provide at least sufficient oxygen for full combustion of the fuel to produce a flue gas with the release of useful heat and with the sulphur from the fuel combining with the alkaline earth metal oxide to form alkaline earth metal sulphate whereby the flue gas is substantially freed of sulphur, means responsive to the reactor bed temperature to increase the amount of fuel combusted in the bed as the bed temperature tends to fall towards 800°C and to decrease the amount of fuel combusted as the bed temperature tends to increase towards 950°C, a regenerator vessel having a bottom and an orificed gas distributor spaced above the bottom, a bed of fluidizable particles supported on the distributor, means for transferring particles from the regenerator bed to the reactor bed at a rate which is related to the rate of fuel combustion in the reactor and means for transferring particles from the region of the reactor bed to the regenerator bed at approximately the same rate as the rate of transfer from the regenerator to the reactor, means for injecting a fuel into the regenerator bed, means for supplying an oxygen containing gas to the space beneath the distributor of the regenerator for fluidizing the particles in the regenerator, means for regulating the rate of supply of oxygen containing gas to the regenerator so that the oxygen is between 40 and 80 percent of the stoichiometric requirement for full combustion of the fuel whereby in operation the fuel is converted to a reducing gas with the release of heat and the reducing gas converts at least some of the alkaline earth metal sulphate to alkaline earth metal oxide with the release of $SO_2$, and means for circulating a heat removing fluid in indirect heat exchange with the hot particles at a rate which is correlated with the rate of fuel combustion in the reactor bed.

21. Apparatus according to claim 20 comprising means for monitoring the concentration of $SO_2$ in the gas leaving the regenerator and means responsive to the $SO_2$ concentration to vary the rate of supply of fuel and oxygen containing gas to the regenerator whereby to maintain the concentration of $SO_2$ leaving the regenerator at approximately a constant concentration.

22. Apparatus according to claim 20 comprising means for sensing the temperature in the regenerator, and means for passing a coolant fluid into the regenerator bed at a rate responsive to the bed temperature whereby the regenerator bed temperature is maintained substantially between 1,000° and 1,150°C.

23. Apparatus according to claim 20 comprising means for monitoring the $SO_2$ content of the flue gases produced in the reactor, means responsive to an $SO_2$ content exceeding a desired maximum content for causing the addition of fresh particles comprising alkaline earth metal oxide to the regenerator bed, and means responsive to the amount of particles in the apparatus to cause dumping of particles in excess of a desired amount from the apparatus.

24. Apparatus according to claim 20 in which the reactor comprises a pocket generally above the level of the bed into the open top of which particles are transferred, during operation, the pocket communicating with the reactor bed through at least one first downcomer tube whereby particles may be transferred directly from the pocket to the reactor bed, and also communicating with a bottom region of the reactor bed through at least one second downcomer tube in which is located at least one heat transfer surface, said surface defining on one side a path for the particles and on the other side a path for said heat removing fluid, means operable for transferring particles through said first downcomer tube and means operable for transferring particles through said second downcomer tube.

25. Apparatus according to claim 24 in which said means operable for transferring particles through said second downcomer tube comprises means responsive to the rate of heat removal by said heat removing fluid to cause the particles to be pneumatically transported at a rate which depends on the said heat removal rate.

26. Apparatus according to claim 20 in which the space beneath the distributor of the reactor is divided into a plurality of cells by vertical walls, whereby when oxygen containing gas is supplied to a cell, the particles only in the part of the bed above the cell are fluidized, there being means for regulating the rate of supply of oxygen containing gas and programming means for causing the gas to be directed to a selected number of cells, the apparatus further comprising means responsive to the programming means for directing the sulphur containing fuel only to the part of the reactor bed which, during operation, is fluidized above the selected number of cells, there being immersed in each part of the reactor bed above each cell a heat exchange means for the circulation therethrough of a heat removing fluid, and control means responsive to the heat requirement from the apparatus for directing the heat removing fluid to the heat exchange means only in the fluidized part of the bed, the fluidized part of the reactor bed being adjacent means for transferring particles between the reactor bed and the regenerator bed.

27. A method according to claim 1 in which the particles are transferred from the reactor bed to the regenerator by intermittent pulses of gas directed towards the regenerator through particles trapped in a transfer tube between the reactor and the regenerator, and particles are transferred from the regenerator bed to the reactor by intermittent pulses of gas directed towards the reactor through particles trapped in a transfer tube between the regenerator and the reactor.

28. A method according to claim 1 in which the particles in the reactor bed comprise, in addition to alkaline earth metal oxide, iron or an iron compound such as iron oxide for removing vanadium from the fuel.

29. A method according to claim 1 in which the particles in the reactor bed comprise alumina for removing sodium from the fuel.

30. Apparatus in which the region of the top of the bed in the reactor is connected to the bottom zone of the regenerator by a first conduit which slopes downwardly from the regenerator and which communicates with a second conduit which extends outwardly from the bottom zone of the regenerator in a generally horizontal direction, the first and second conduits having a junction, the wall of which most remote from the regenerator is downwardly sloping towards the bottom of the regenerator, whereby during operation, particles from the reactor become trapped in the first conduit and in the region of the junction, there being a tube extending through said remote wall of the junction through which, in operation, intermittent pulses of gas are provided whereby to transport particles pneumatically from the region of the junction and the second conduit into the bottom zone of the regenerator, there being a like first conduit extending downwardly from the region of the top of the regenerator bed to a like junction with a like second conduit communicating with the bottom zone of the reactor and provided, in a like sloping wall, with a like tube for delivering intermittent gas pulses for pneumatically transporting particles into the reactor from the regenerator.

31. Apparatus according to claim 30 in which each first conduit is provided at its upper end with a pocket which is open to the respective particle-containing vessel, the volume of the pocket exceeding the gross volume of material which is penumatically transported by each gas pulse, the size and shape of the opening to the pocket from its respective vessel, and the position of the opening relative to the top of the bed of particles, when fluidized, being such that an adequate quantity of particles splash into the pocket during operation to prevent any substantial flow of gas up to the respective first conduit against the resistance of particles packed therein.

32. Apparatus according to claim 7 in which the region of the top of the bed in the reactor is connected to the bottom zone of the regenerator by a first conduit which slopes downwardly from the regenerator and which communicates with a second conduit which extends outwardly from the bottom zone of the regenerator in a generally horizontal direction, the first and second conduits having a junction, the wall of which most remote from the regenerator is downwardly sloping towards the bottom of the regenerator, whereby during operation, particles from the reactor become trapped in the first conduit and in the region of the junction, there being a tube extending through said remote wall of the junction through which, in operation, intermittent pulses of gas are provided whereby to transport particles pneumatically from the region of the junction and the second conduit into the bottom zone of the regenerator, there being a like first conduit extending downwardly from the region of the top of the regenerator bed to a like junction with a like second conduit communicating with the bottom zone of the reactor and provided, in a like sloping wall, with a like tube for delivering intermittent gas pulses for pneumatically transporting particles into the reactor from the regenerator.

33. A method according to claim 13 in which the particles are transferred from the region of the top of the reactor bed to the bottom zone of the regenerator by intermittent pulses of gas directed towards the regenerator through particles trapped in a transfer tube between the reactor and the regenerator, and particles are transferred from the region of the top of the regenerator bed to the bottom zone of the reaction by intermittent pulses of gas directed towards the reactor through particles trapped in a transfer tube between the regenerator and the reactor.

34. A method according to claim 1 in which the rate of supply of free oxygen containing gas to the reactor is substoichiometric relative to the rate of supply of fuel to the reactor whereby the fuel is converted into substantially sulphur free combustible gases at a reactor bed temperature of 800°–950°C, the regenerating gas comprising free oxygen, and the rate of supply of free oxygen to the regenerator bed being sufficient to maintain the temperature in the regenerator at from 1,000° to 1,150°C and to regenerate alkaline earth metal oxides with the release of $SO_2$, the concentration of $O_2$ in the gas leaving in the regenerator being monitored and the rate of supply of the regenerating gas being regulated so that the concentration of $O_2$ in the gas produced in the regenerator is substantially constant.

35. Apparatus according to claim 7 comprising valve means for mixing oxygen containing gas and flue gas (obtained by combustion of the substantially sulphur-free combustible gases produced in the reactor) in desired proportions and amounts whereby to maintain the superficial velocity of gas through the reactor bed above the velocity at which substantial defluidization of particles will occur in the bed, the valve means responding to a signal indicative of the demand for substantially sulphur-free combustible gas.

36. Apparatus according to claim 7 comprising means for sensing the $O_2$ content of the gases leaving the regenerator and means for regulating the supply of oxygen containing gas to the regenerator to maintain a selected concentration of $O_2$ in the regenerator off gases.

37. Apparatus according to claim 32 in which each first conduit is provided at its upper end with a pocket which is open to the respective particle-containing vessel, the volume of the pocket exceeding the gross volume of material which is pneumatically transported by each gas pulse, the size and shape of the opening to the pocket from its respective vessel, and the position of the opening relative to the top of the bed of particles, when fluidized, being such that an adequate quantity of particles splash into the pocket during operation to prevent any substantial flow of gas up to the respective first conduit against the resistance of particles packed therein.

38. A method according to claim 4 in which the rate of supply of flue gas to the reactor, relative to the free oxygen containing gas, is increased as the reactor bed temperature rises towards 950°C and is decreased as the reactor bed temperature falls towards 800°C.

39. A method according to claim 13 in which the regenerator bed temperature is sensed and the rate of transfer of particles from the reactor bed to the regenerator bed is increased as the regenerator bed temperature rises towards 1,150°C and is decreased as the regenerator bed temperature falls towards 1,000°C.

40. A method according to claim 13 in which the rate of transfer of particles between the regenerator bed and the reactor bed is regulated in accordance with the rate of fuel supply to the reactor.

41. Apparatus according to claim 20 comprising means for sensing the temperature in the regenerator bed, and means responsive to the regenerator bed temperature to increase the rate of transfer of particles from the reactor bed to the regenerator bed as the regenerator bed temperature rises towards 1,150°C and to reduce the rate of transfer of particles from the reactor bed to the regenerator bed as the regenerator bed temperature falls towards 1,100°C.

42. Apparatus according to claim 20 in which the means for transferring particles between the regenerator and reactor beds respond to the rate of fuel combustion in the reactor bed to increase the rate of particle transfer when the fuel combustion rate is increased and to decrease the transfer rate when the fuel combustion rate is reduced.

* * * * *

UNITED STATES PATENT OFFICE
CERTIFICATE OF CORRECTION

Patent No. 3,807,090  Dated April 30, 1974

Inventor(s) Gerald Moss

It is certified that error appears in the above-identified patent and that said Letters Patent are hereby corrected as shown below:

(a) Column 14, line 1, the recitation "one of seven" should read --107--;

(b) Column 24, line 6, (claim 7, line 6), the recitation "supported on" should read --extending above--;

(c) Column 24, lines 9 and 10 (claim 7, lines 9 and 10), the recitation "space between the bottom and the" should not appear;

(d) Column 24, line 29 (claim 7, line 29), the recitation "supported on" should read --extending above--;

(e) Column 25, line 3 (claim 10, line 3), the recitation "beneath" should read --to--;

(f) Column 26, line 26 (claim 20, line 6), the recitation "supported on" should read --extending above--;

(g) Column 26, line 30 (claim 20, line 10), the recitation "the space beneath" should not appear;

(h) Column 26, line 31 (claim 20, line 11), the recitation "above the bed" should not appear;

(i) Column 26, line 46 (claim 20, line 26), the recitation "supported on" should read --extending above--; and (j) Column 27, line 46 (claim 26, line 2), the recitation "space beneath" should not appear.

Signed and sealed this 11th day of February 1975.

(SEAL)
Attest:

RUTH C. MASON
Attesting Officer

C. MARSHALL DANN
Commissioner of Patents
and Trademarks